United States Patent
Kaneko et al.

(10) Patent No.: US 9,146,859 B2
(45) Date of Patent: Sep. 29, 2015

(54) INFORMATION PROCESSING APPARATUS, METHOD, AND PROGRAM FOR IMPROVING USE EFFICIENCY OF A STORAGE APPARATUS

(71) Applicant: Sony Corporation, Tokyo (JP)

(72) Inventors: Nobuhiro Kaneko, Kanagawa (JP); Hiroki Nagahama, Tokyo (JP); Tetsuya Asayama, Tokyo (JP); Tomohiro Katori, Tokyo (JP); Katsuya Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 171 days.

(21) Appl. No.: 13/894,658

(22) Filed: May 15, 2013

(65) Prior Publication Data

US 2013/0332661 A1    Dec. 12, 2013

(30) Foreign Application Priority Data

Jun. 7, 2012    (JP) .................................. 2012-129671

(51) Int. Cl.
*G06F 12/00* (2006.01)
*G06F 12/02* (2006.01)

(52) U.S. Cl.
CPC .... *G06F 12/0246* (2013.01); *G06F 2212/7211* (2013.01)

(58) Field of Classification Search
None
See application file for complete search history.

(56) References Cited

U.S. PATENT DOCUMENTS

| | | | | |
|---|---|---|---|---|
| 6,000,006 A * | 12/1999 | Bruce et al. | ................... | 711/103 |
| 2004/0177212 A1* | 9/2004 | Chang et al. | ................... | 711/103 |
| 2008/0005453 A1* | 1/2008 | Mizuyama | ................... | 711/103 |
| 2009/0122949 A1* | 5/2009 | Reid et al. | ....................... | 377/15 |
| 2009/0157947 A1* | 6/2009 | Lin et al. | ....................... | 711/103 |
| 2009/0287875 A1* | 11/2009 | Lin | ............................. | 711/103 |

FOREIGN PATENT DOCUMENTS

JP    2010-186477    8/2010

* cited by examiner

*Primary Examiner* — Kaushikkumar Patel
(74) *Attorney, Agent, or Firm* — Hazuki International, LLC

(57) ABSTRACT

There is provided an information processing apparatus including a rewrite frequency management section configured to manage a rewrite frequency of a page included in a nonvolatile primary storage apparatus having an upper limit in the rewrite frequency, and a data processing section configured, when an instruction for writing write data to a predetermined page is issued and a rewrite frequency of the predetermined page reaches a threshold value that is less than the upper limit of the rewrite frequency of the primary storage apparatus, to write the write data to another page different from the predetermined page, the other page storing no effective data and having a rewrite frequency that does not reach the threshold value.

12 Claims, 25 Drawing Sheets

INFORMATION PROCESSING APPARATUS, METHOD, AND PROGRAM FOR IMPROVING USE EFFICIENCY OF A STORAGE APPARATUS

BACKGROUND

The present technology relates to an information processing apparatus and method and a program, and more particularly to an information processing apparatus and method and a program for enabling the use efficiency of a nonvolatile memory having an upper limit in a rewrite frequency to be improved.

In the related art, technology related to memory management for appropriately using each area of a memory in a nonvolatile memory having an upper limit in a rewrite frequency has been proposed.

For example, as the above-described technology, there is technology for storing a page table including mapping information of virtual and physical addresses on a memory and managing the memory using the page table (for example, see Japanese Unexamined Patent Application Publication No. 2010-186477).

In this technology, the mapping information includes write frequency information of each page on the memory and a data storage position is managed based on the write frequency information. Specifically, when the write frequency for a page on the memory has reached a durability limit, data of the page is moved to another page and the mapping information is updated according to the movement.

SUMMARY

However, in the above-described technology, it is difficult to efficiently use the memory.

As described above, when a write frequency for a predetermined page of a memory reaches the end of life by a durability limit in a nonvolatile memory having an upper limit in the rewrite frequency, it is difficult to write data to the page thereafter. That is, it is difficult to use the page. For example, if writing to a specific page on the memory occurs frequently, the page reaches the end of its life earlier than other pages, and an available capacity of the memory is reduced every time writing to the same page occurs frequently.

Then, even when a use frequency of the entire memory is relatively low, the available memory capacity of the memory is insufficient and it is difficult to use previously used application programs.

When there is a bias toward a write frequency of data for each page on the memory, the use efficiency of the memory is degraded.

It is desirable to improve the use efficiency of a nonvolatile memory having an upper limit in a rewrite frequency.

According to an embodiment of the present disclosure, there is provided an information processing apparatus including a rewrite frequency management section configured to manage a rewrite frequency of a page included in a nonvolatile primary storage apparatus having an upper limit in the rewrite frequency, and a data processing section configured, when an instruction for writing write data to a predetermined page is issued and a rewrite frequency of the predetermined page reaches a threshold value that is less than the upper limit of the rewrite frequency of the primary storage apparatus, to write the write data to another page different from the predetermined page, the other page storing no effective data and having a rewrite frequency that does not reach the threshold value.

The information processing apparatus may further include a threshold value update section configured, when all the rewrite frequencies of the pages are greater than or equal to the threshold value, to calculate a new threshold value that is greater than the threshold value and less than or equal to the upper limit, and to update the threshold value.

The threshold value update section may calculate a new threshold value by adding a fixed value specified for the upper limit to the threshold value.

When the instruction for writing the write data to the predetermined page is issued and the rewrite frequency of the predetermined page and the rewrite frequency of the page storing no effective data is stored reach the threshold value, the data processing section may search for the page having the rewrite frequency that does not reach the threshold value from among the pages storing effective data, and moves data stored in the searched page to the page storing no effective data.

The data processing section may write the write data to the searched page after moving the data of the searched page.

The rewrite frequency of the page may be stored in the primary storage apparatus.

The rewrite frequency of the page may be stored in a position uniquely specified for the page or a position obtained in a calculation operation from the page position.

The information processing apparatus may further include a conversion information management section configured to allocate a virtual page number to the page and manage logical-physical conversion information indicating correspondence between the virtual page number of the page and a physical page number.

When a predetermined virtual page number is allocated to the predetermined page and the write data to which the predetermined virtual page number has been designated as a write destination has been written to the other page, the conversion information management section may change allocation of the predetermined virtual page number from the predetermined page to the other page.

The rewrite frequency of the page is stored in an area different from that of the logical-physical conversion information.

At least one of the logical-physical conversion information and the threshold value may be stored in the page.

According to an embodiment of the present disclosure, there is provided an information processing method including managing a rewrite frequency of a page included in a nonvolatile primary storage apparatus having an upper limit in the rewrite frequency, and writing, when an instruction for writing write data to a predetermined page is issued and a rewrite frequency of the predetermined page reaches a threshold value that is less than the upper limit of the rewrite frequency of the primary storage apparatus, the write data to another page different from the predetermined page, the other page storing no effective data and having a rewrite frequency that does not reach the threshold value.

According to an embodiment of the present disclosure, there is provided a program for causing a computer to execute managing a rewrite frequency of a page included in a nonvolatile primary storage apparatus having an upper limit in the rewrite frequency, and writing, when an instruction for writing write data to a predetermined page is issued and a rewrite frequency of the predetermined page reaches a threshold value that is less than the upper limit of the rewrite frequency of the primary storage apparatus, the write data to another page different from the predetermined page, the other page storing no effective data and having a rewrite frequency that does not reach the threshold value.

According to the embodiments of the present technology described above, the use efficiency of a nonvolatile memory having an upper limit in a rewrite frequency can be improved.

DETAILED DESCRIPTION OF THE EMBODIMENT(S)

Figure 1:
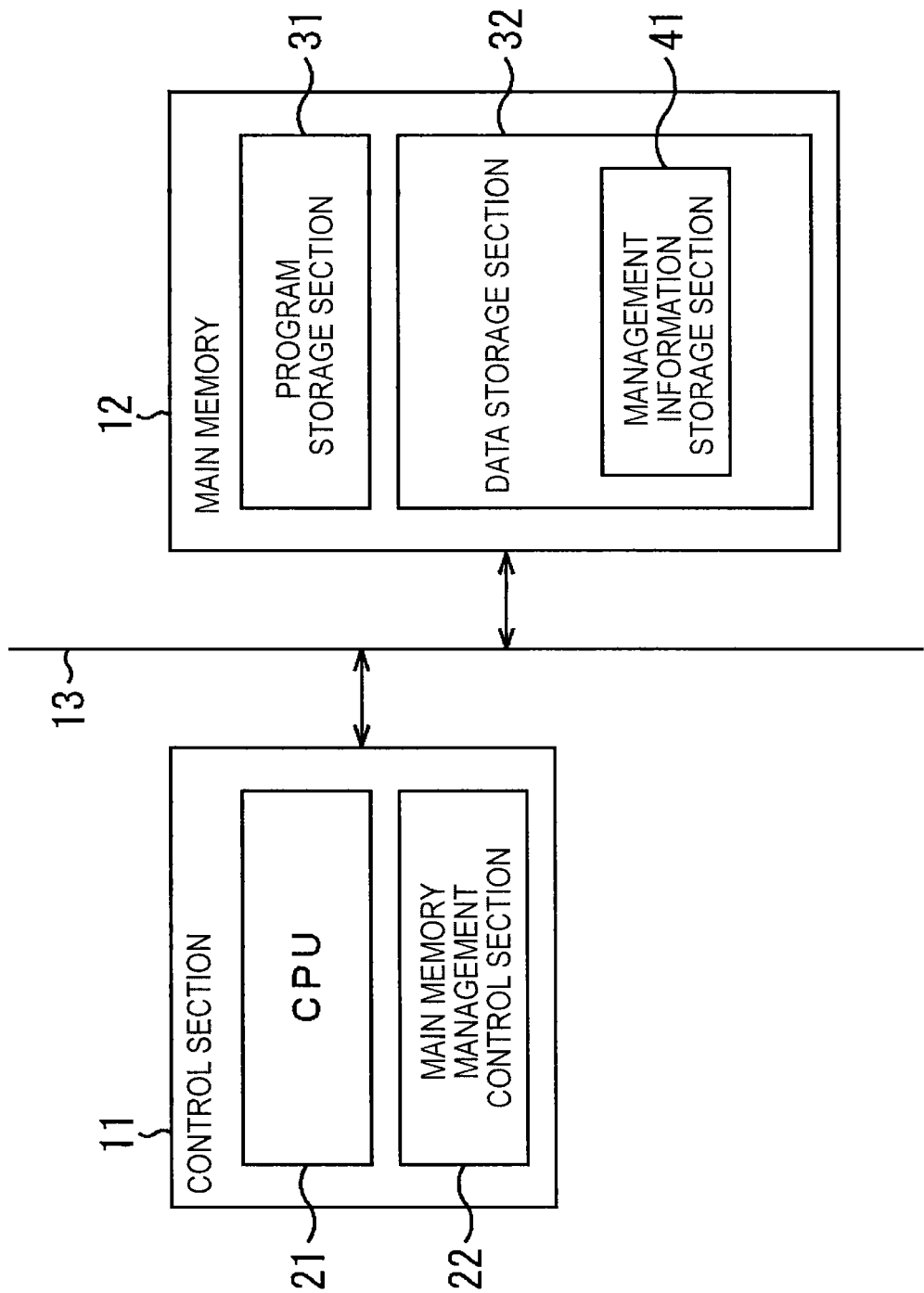
FIG. 1 is a diagram illustrating a configuration example of an information processing system.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present technology will be described in detail with reference to the appended drawings.

First Embodiment

Features of Present Technology

First, the features of the present technology will be described.

The present technology relates to a system in which a nonvolatile memory having an upper limit in a rewrite frequency is used in a main memory. In this system, a predetermined area of the main memory is divided into arbitrary size units each having one or more bytes and managed in the size units.

Also, hereinafter, each area of the main memory divided into the predetermined size unit is referred to as a page, and a magnitude of each page, that is, a size unit of a division of the main memory, is referred to as a page size. In addition, the main memory used in the present technology is a primary storage apparatus, which is directly accessed by a processing unit that executes a program, and from or to which data can be read or written, and the processing unit can randomly access each area of the primary storage apparatus.

In particular, the present technology to be applied to the above-described system has the following features (1) to (5).

(1) Information regarding a rewrite frequency of a page is held for each page of the main memory.

(2) A plurality of threshold values th less than or equal to an upper limit MX are specified with respect to the upper limit MX of the rewrite frequency of the main memory and the main memory is managed using the threshold values th in ascending order thereof.

(3) When the rewrite frequency has reached the threshold value th in use with respect to a predetermined page (movement source page), data of a movement source page is moved to another page (movement destination page) in which effective data is not stored.

(4) When the rewrite frequency of the movement destination page is greater than or equal to the threshold value th, a page in which effective data is stored and of which a rewrite frequency is less than the threshold value th is searched for, data of the page obtained as the search result is moved to the movement destination page, and the page obtained in the search is set to a new movement destination page.

(5) When the rewrite frequencies of all pages within the main memory has reached the threshold value th in use, the main memory is managed using the next threshold value th greater than the threshold value th.

It is possible to average the rewrite frequency of each area (page) within the main memory divided into page size units and improve the use efficiency of the main memory according to the above features (1) to (5). Thereby, it is possible to extend the life of the nonvolatile memory (main memory) having the upper limit in the rewrite frequency and extend the life of the system using the main memory as a result.

Also, in order to implement the system having the features (1) to (5), it is necessary to hold management information including information regarding the rewrite frequency of each page or logical-physical conversion information. Here, the logical-physical conversion information is information indicating correspondence between a physical address (physical page number) indicating an actual page position on the main memory and a virtual address (virtual page number) of the page.

The management information may be set to be stored in the main memory or in another memory. For example, when the management information is stored in the main memory, it is possible to further improve the use efficiency of the main memory by further including the following features (6) and (7) for a system to which the present technology has been applied.

(6) Information regarding the rewrite frequency of each page is stored in the main memory.

(7) A storage position of information regarding a rewrite frequency of the page is set to a position capable of being calculated in a calculation operation for each page or a position uniquely specified for each page. Therefore, an area in which information regarding a rewrite frequency is stored is set to an area of a size in which a value of the upper limit MX of the rewrite frequency can be stored.

According to the above features (6) and (7), it is possible to reduce a size of information regarding management of a main memory.

For example, in the technology described in the above-described Japanese Unexamined Patent Application Publication No. 2010-186477, a pointer indicating a storage position of write frequency information of each page is necessary, and a position at which the pointer is stored should be secured within the page table. Thus, a data size of the page table increases and an area in which other data on the memory can be stored decreases. Then, rewriting of data of each area increases and the life of the memory decreases.

On the other hand, because it is possible to specify a storage position of information regarding the rewrite frequency even when there is no information indicating a storage position of information regarding a rewrite frequency of a page according to the features (6) and (7) in the present technology, a size of the management information can be thereby reduced.

Thereby, because it is possible to secure more area in which other data can be stored by a size reduction amount of management information, it is possible to improve the use efficiency of the main memory and further extend the life of the main memory.

In addition, because the write frequency information is included in mapping information in the technology described in the above-described Japanese Unexamined Patent Application Publication No. 2010-186477, rewriting is performed in an area in which mapping information is stored every time write frequency information is updated, and the life of the area is shortened.

On the other hand, in the present technology, it is possible to reduce an update frequency of the logical-physical conversion information or the like other than information regarding the rewrite frequency of the page by separating a storage position of the logical-physical conversion information included in the management information and the storage position of the information regarding the rewrite frequency of the page and individually managing the above-described information. Thereby, it is possible to extend the life of the main memory.

[Configuration Example of Information Processing System]

Next, a specific embodiment to which the present technology has been applied will be described. FIG. 1 is a diagram illustrating a configuration example of an embodiment of an information processing system to which the present technology has been applied.

The information processing system of FIG. 1 is provided in an arbitrary information processing apparatus in which the nonvolatile memory having the upper limit in the rewrite frequency is used as the main memory (primary storage apparatus), and the information processing system includes a control section 11, a main memory 12, and a bus 13.

In the information processing system, the control section 11 uses the main memory 12, which is the nonvolatile memory having the upper limit in the rewrite frequency, as the primary storage apparatus, and directly and randomly accesses the main memory 12 via the bus 13 without the necessity for a drive or the like.

The control section 11 connected to the main memory 12 via the bus 13 reads data from or writes data to the main memory 12 when a predetermined process is executed or manages the main memory 12. In the control section 11, a central processing unit (CPU) 21 and a main memory management control section 22 are provided.

The CPU 21 performs various processes by executing a program stored in the main memory 12, and writes data to the main memory 12 via the main memory management control section 22 when the process is executed.

The main memory management control section 22 manages the main memory 12, and accesses an arbitrary area of the main memory 12 according to an instruction of the CPU 21 to read or write data therefrom or thereto.

The main memory 12 is a nonvolatile memory for which an upper limit MX is provided in the rewrite frequency, and functions as the main memory (primary storage apparatus) of the information processing system. In the main memory 12, a program storage section 31 and a data storage section 32 are provided.

The program storage section 31 includes an area on the main memory 12 in which a program to be executed by the CPU 21 is stored, and the program stored in the program storage section 31 is read to the control section 11 via the bus 13.

The data storage section 32 is divided into pages each having a predetermined page size and managed, and a management information storage section 41 is provided in the data storage section 32.

The management information storage section 41 includes an area in which logical-physical conversion information indicating correspondence between a physical page number, which specifies each page of the data storage section 32, and a virtual page number or management information including a rewrite frequency of each page is stored. The management information stored in the management information storage section 41 is managed by the main memory management control section 22.

In addition, data for enabling the CPU 21 to execute various processes is stored in an area (page) other than the management information storage section 41 of the data storage section 32. When the CPU 21 executes a process, the main memory management control section 22 writes data to each page.

[Management Information]

Here, the management information stored in the management information storage section 41 will be described.

Figure 2:
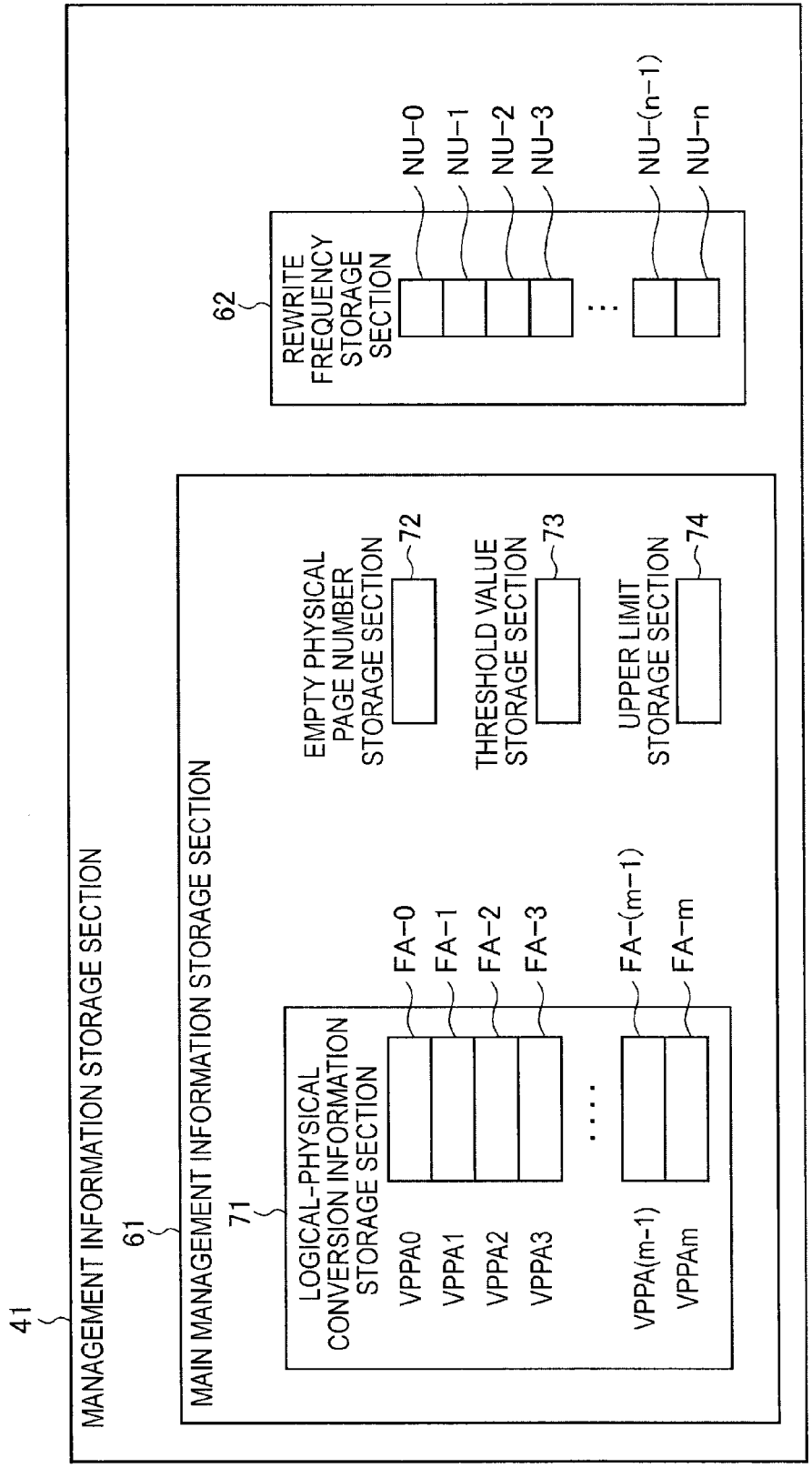
FIG. 2 is a diagram illustrating a configuration example of a management information storage section.

For example, a main management information storage section 61 and a rewrite frequency storage section 62 are provided as an area for storing information included in the management information in the management information storage section 41 as illustrated in FIG. 2.

The main management information storage section 61 is an area in which main information such as logical-physical conversion information included in the management information is stored. In the main management information storage section 61, a logical-physical conversion information storage section 71, an empty physical page number storage section 72, a threshold value storage section 73, and an upper limit storage section 74 are provided.

The logical-physical conversion information storage section 71 is an area in which logical-physical conversion information is stored. In the logical-physical conversion information storage section 71, physical page number storage sections FA-0 to FA-m in which physical page numbers (physical addresses) of pages of the data storage section 32 serving as the logical-physical conversion information are stored are provided. Hereinafter, the physical page number storage sections FA-0 to FA-m are also simply referred to as a physical page number storage section FA when it is not necessary to individually distinguish them.

For example, the data storage section 32 is divided into a plurality of pages, and the remaining pages are set to (n+1) pages, which are specified by physical page numbers PPA0 to PPAn, except for the page serving as the rewrite frequency storage section 62 among the pages.

Also, unless otherwise noted hereinafter, when a page is merely mentioned, the page will be continuously described as each page of the (n+1) pages specified by the physical page numbers PPA0 to PPAn.

It is assumed that a total of (m+1) (here, m≤n) virtual page numbers (virtual page addresses) of virtual page numbers VPPA0 to VPPAm at the most can be allocated for the (n+1) pages of the data storage section 32.

Here, the virtual page number is a virtual page number defined so that a higher-order layer or operating system (OS) such as a program is not caused to be aware of the distribution of physical page numbers of pages in which data is stored by averaging rewrite frequencies of the pages.

In the logical-physical conversion information storage section 71, physical page number storage sections FA storing physical page numbers of pages to which virtual page numbers have been allocated in the order of the virtual page numbers VPPA0 to VPPAm from an upper portion to a lower portion in the drawing are aligned and provided.

Thus, it is known which virtual page number is allocated to a page specified by a physical page number stored in the physical page number storage section FA according to a position of the physical page number storage section FA in the logical-physical conversion information storage section 71. In the logical-physical conversion information storage section 71, information including physical page numbers stored in the physical page number storage sections FA becomes logical-physical conversion information.

In addition, in the empty physical page number storage section 72 of the main management information storage section 61, one physical page number of a page (hereinafter also referred to as an empty page) in which no effective data is stored among pages of the data storage section 32 is stored as an empty physical page number.

Here, the empty page is a page in which unnecessary data is stored or in which no data is stored. In other words, a page to which no virtual page number is allocated and in which no management information is stored becomes an empty page at that time point.

For example, in the empty physical page number storage section 72, a physical page number of one empty page satisfying a predetermined condition among some empty pages is stored as an empty physical page number.

Empty page numbers are stored in the empty physical page number storage section 72 and one empty page is secured as described above for the following reason. That is, this is because position information (a physical page number) of a page serving as an allocation destination of a virtual page number or a data movement destination is held in advance when a virtual page number is newly allocated to an empty page or data is moved.

In the threshold value storage section 73, a threshold value th calculated based on the upper limit MX of the rewrite frequency of the main memory 12 is stored and allocation of a virtual page number to each page is controlled using the threshold value th. In addition, the threshold value th is updated when rewrite frequencies of all pages reach the threshold value th. For example, the threshold value th is increased to the upper limit MX every time the threshold value th is updated to a value of 10% of the upper limit MX of the rewrite frequency, a value of 20%, . . . , a value of 90%, and a value of 100%.

Further, in the upper limit storage section 74 of the main management information storage section 61, a predetermined upper limit MX of the rewrite frequency of the main memory 12 is stored.

Hereinafter, information including the logical-physical conversion information stored in the main management information storage section 61, the empty physical page number, the threshold value th, and the upper limit MX of the rewrite frequency is referred to as main management information included in management information.

In addition, the rewrite frequency for each page on the data storage section 32 is stored in the rewrite frequency storage section 62 of the management information storage section 41. Specifically, frequency information storage sections NU-0 to NU-n in which rewrite frequencies of pages specified by the physical page numbers PPA0 to PPAn are stored are provided in the rewrite frequency storage section 62.

For example, the rewrite frequency of the page specified by the physical page number PPA0 is stored in the frequency information storage section NU-0. Also, hereinafter, the frequency information storage sections NU-0 to NU-n are simply referred to as the frequency information storage section NU when it is not necessary to individually distinguish them.

[Data Structure of Data Storage Section]

Figure 3:
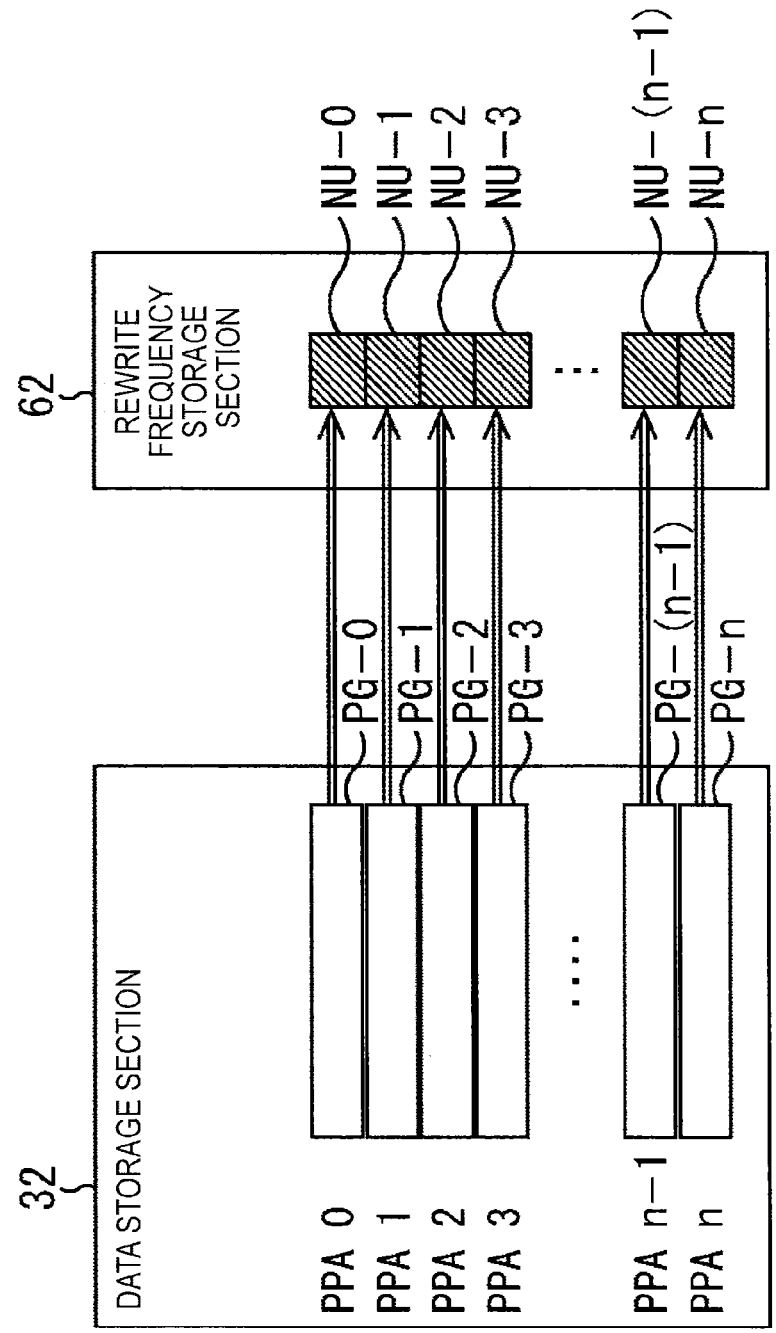
FIG. 3 is a diagram illustrating a correspondence relationship between a data storage section and a rewrite frequency storage section.

Incidentally, pages PG-0 to PG-n specified by the physical page numbers PPA0 to PPAn are provided in the data storage section 32 as illustrated in FIG. 3. For example, the magnitude of each of the pages, that is, a page size, is 4 KB or the like.

Also, hereinafter, the pages PG-0 to PG-n are simply referred to as the page PG when it is not necessary to individually distinguish them.

In addition, the frequency information storage sections NU-0 to NU-n are associated with the pages PG-0 to PG-n, respectively. Here, an arrangement position of each frequency information section NU is a position capable of being specified from the physical page number of the page PG corresponding to the frequency information storage section NU.

That is, the frequency information storage section NU has a position specified by a value calculated in a calculation operation using a physical page number of a page PG corresponding to the frequency information storage section NU or a position uniquely specified for the physical page number of the page PG. In addition, the size of the frequency information storage section NU is a size in which a value of the upper limit MX of the rewrite frequency can be stored.

Figure 4:
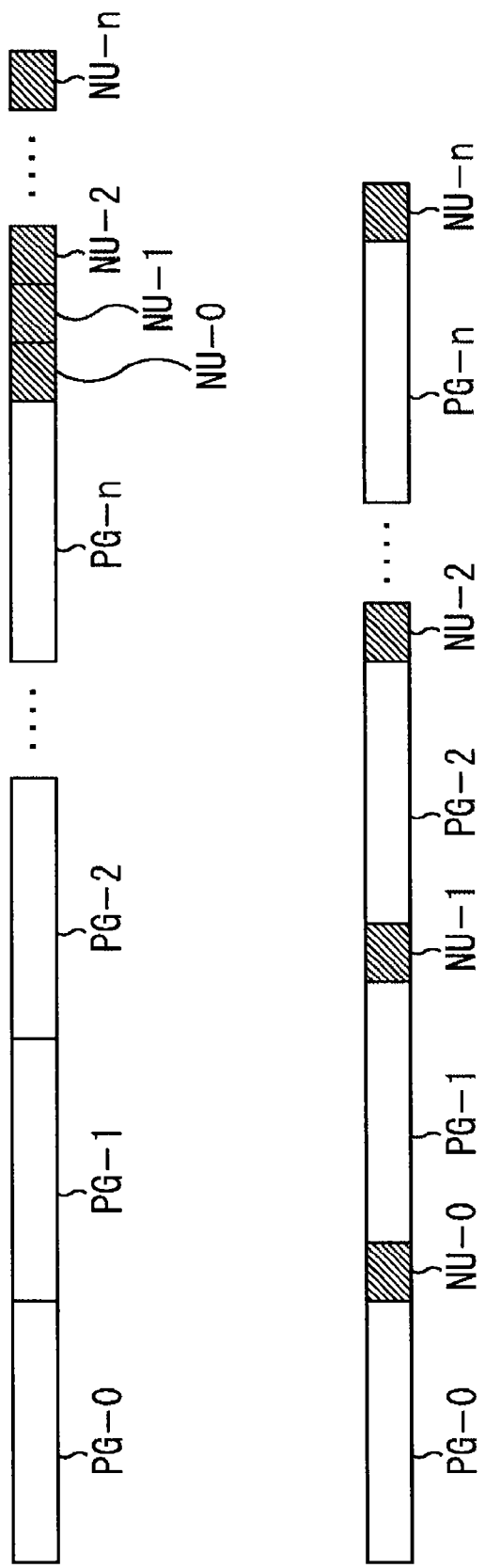
FIG. 4 is a diagram illustrating an arrangement example of a frequency information storage section.

For example, when the main memory 12 is a nonvolatile RAM (NVRAM), an arrangement area of each page PG on the data storage section 32 and an arrangement area of the frequency information storage section NU may be known as illustrated in the upper portion of FIG. 4. Also, parts of FIG.

4 corresponding to those of FIG. 3 are assigned the same reference signs, and description thereof is appropriately omitted.

In this example, the pages PG-0 to PG-n are sequentially aligned and arranged from the head of the data storage section 32, and the frequency information storage sections NU-0 to NU-n are sequentially aligned and arranged subsequent to the page PG-n. Thus, the frequency information storage section NU is set to be provided in each page different from the page PG among pages included in the data storage section 32.

In this case, an area including a page PG in which main management information is stored among pages PG, that is, a page PG serving as the main management information storage section 61, and the frequency storage section NU becomes an area of the management information storage section 41.

Also, although the case in which the frequency information storage section NU included in the data storage section 32 is provided has been described above, the frequency information may not be provided in the page area. In this case, for example, a predetermined area having a fixed size is secured as the frequency information storage section NU, an area excluding the frequency information storage section NU of the data storage section 32 is divided into areas each having the magnitude of the page size, and a division area is a page PG.

Therefore, for example, the page PG and the frequency information storage section NU are alternately arranged from the head of the data storage section 32 as illustrated in the lower portion in FIG. 4. In this example, because the frequency information storage section NU in which the rewrite frequency related to the page PG is stored is arranged immediately after the page PG, it is possible to specify the position of a corresponding frequency information storage section NU from the position of the page PG. In addition, the area within each page PG may be set to be the frequency information storage section NU.

[Configuration Example of Main Memory Management Control Section]

Figure 5:
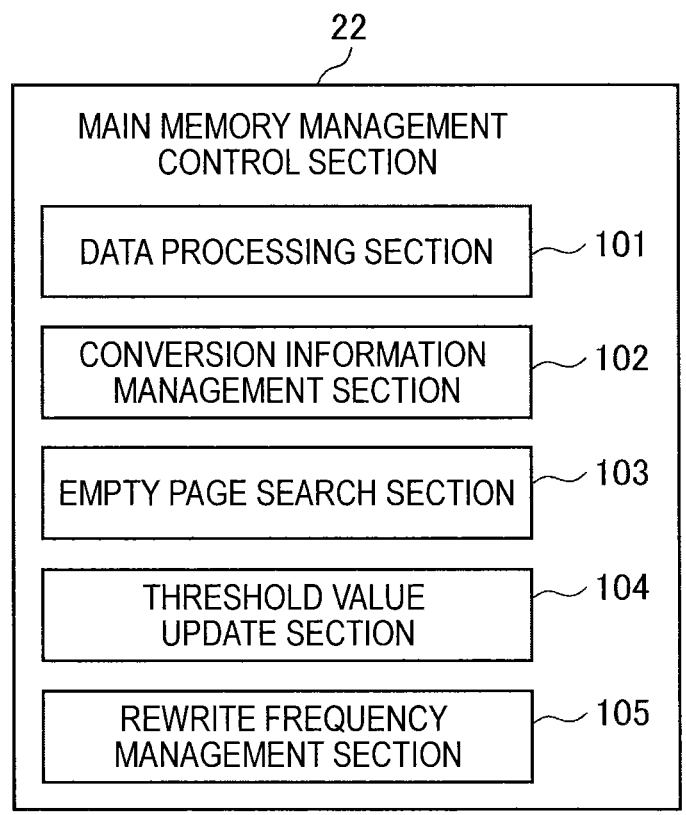
FIG. 5 is a diagram illustrating a configuration example of a main memory management control section.

Further, a further detailed configuration example of the main memory management control section 22 of FIG. 1 will be described. FIG. 5 is a diagram illustrating a configuration example of the main memory management control section 22 of FIG. 1.

The main memory management control section 22 of FIG. 5 includes a data processing section 101, a conversion information management section 102, an empty page search section 103, a threshold value update section 104, and a rewrite frequency management section 105.

The data processing section 101 controls writing of data to the page PG of the data storage section 32 or reading of data from the page PG according to an instruction of the CPU 21. The conversion information management section 102 manages logical-physical conversion information stored in the logical-physical conversion information storage section 71. The empty page search section 103 searches for an empty page satisfying a predetermined condition from the pages PG or manages the empty physical page number storage section 72. The threshold value update section 104 calculates a threshold value th based on the upper limit stored in the upper limit storage section 74 or manages the threshold value storage section 73. The rewrite frequency management section 105 manages the rewrite frequency storage section 62.

[Description of Data Write Process in Initial State]

Next, an operation of the information processing system of FIG. 1 will be described.

Figure 6:
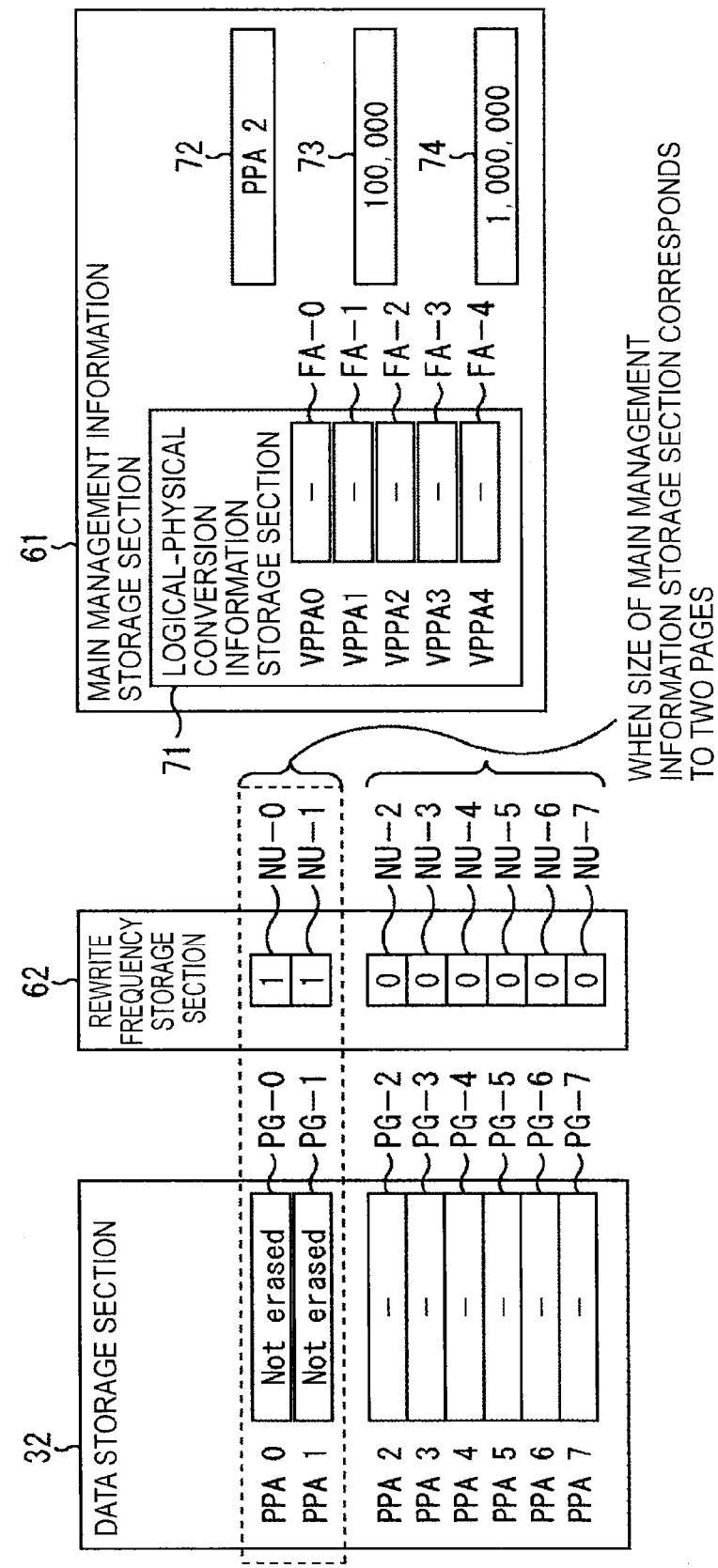
FIG. 6 is a diagram illustrating an initial state of management information.

For example, the initial state of the main memory 12, that is, a state in which writing of data to the main memory 12 is not performed by the control section 11, is a state illustrated in FIG. 6. Also, parts of FIG. 6 corresponding to those of FIG. 2 or 3 are assigned the same reference signs, and description thereof is appropriately omitted.

In the example of FIG. 6, eight pages PG-0 to PG-7 are provided in the data storage section 32. That is, the initial state illustrated in FIG. 6 is the case in which an integer n of the page PG-n in FIG. 3 is n=7.

In FIG. 6, main management information is already stored in the pages PG-0 and PG-1 and the two pages serve as an area of the main management information storage section 61. Thus, "1" is stored as rewrite frequencies in the frequency information storage sections NU-0 and NU-1 corresponding to the pages PG-0 and PG-1.

Also, the main management information stored in the page PG of the data storage section 32 is moved to another page PG according to the rewrite frequency for each page PG but the main memory management control section 22 is assumed to constantly recognize a storage position of the main management information.

On the other hand, the other pages PG-2 to PG-7 are in a state in which data is not yet written, and "0" is stored as rewrite frequencies in the frequency information storage sections NU-2 and NU-7 corresponding to the pages.

In addition, in the logical-physical conversion information storage section 71 of the main management information storage section 61, physical page number storage sections FA-0 to FA-4 are provided for five virtual page numbers VPPA0 to VPPA4.

In this example, a physical page number is not yet stored in each physical page number storage section FA. That is, the current state is a state in which the virtual page numbers VPPA0 to VPPA4 are not allocated to any pages.

Because the five physical page number storage sections FA are provided in the logical-physical conversion information storage section 71 illustrated in FIG. 6, the CPU 21 can store data other than the management information in five pages.

For example, eight pages PG are provided in the data storage section 32 and two pages thereof are used to store main management information. Therefore, because it is necessary to secure at least one empty page in the data storage section 32, the number of pages, 5, obtained by subtracting the number of necessary pages, 3 (=2+1), from the total number of pages, 8, is the number of pages for storing data.

In addition, in the data storage section 32, an empty page having a smallest physical page number is secured as a storage destination of new data (an allocation destination of a virtual page number) or a data movement destination. Therefore, the physical page number PPA2 of the empty page is stored in the empty physical page number storage section 72.

In the threshold value storage section 73, a numerical value "100000" is stored as the threshold value th calculated based on the upper limit MX of the rewrite frequency of the main memory 12. Further, in the upper limit storage section 74, a numerical value "1000000" is stored as the predetermined upper limit MX of the rewrite frequency of the main memory 12.

Also, in this example, the threshold value th in the initial state is "100000," which is a value corresponding to 10% of the upper limit MX=1000000. Thereafter, for every update, the threshold value th is assumed to be incremented by a value "100000" corresponding to 10% of the upper limit MX=1000000. In other words, the threshold value th in the initial state is a value less than the upper limit MX. When the threshold value is updated, a predetermined fixed value is added to the threshold value th and a new threshold value th is generated.

If the CPU 21 accesses the program storage section 31 via the main memory management control section 22 and executes a program stored in the program storage section 31 when the data storage section 32 is in the initial state illustrated in FIG. 6, various processes are performed. At this time, if the CPU 21 issues an instruction for writing new data to the data storage section 32, a data write process is started in the initial state.

Hereinafter, the data write process in the initial state by the information processing system will be described with reference to the flowchart of FIG. 7 and FIG. 8.

In step S11, the data processing section 101 of the main memory management control section 22 writes data supplied from the CPU 21 to the empty page of the data storage section 32 according to an instruction of the CPU 21.

For example, the data processing section 101 refers to the empty physical page number storage section 72 in the initial state illustrated in FIG. 6, and writes data to the page PG-2 specified by the physical page number PPA2 stored therein.

Figure 8:
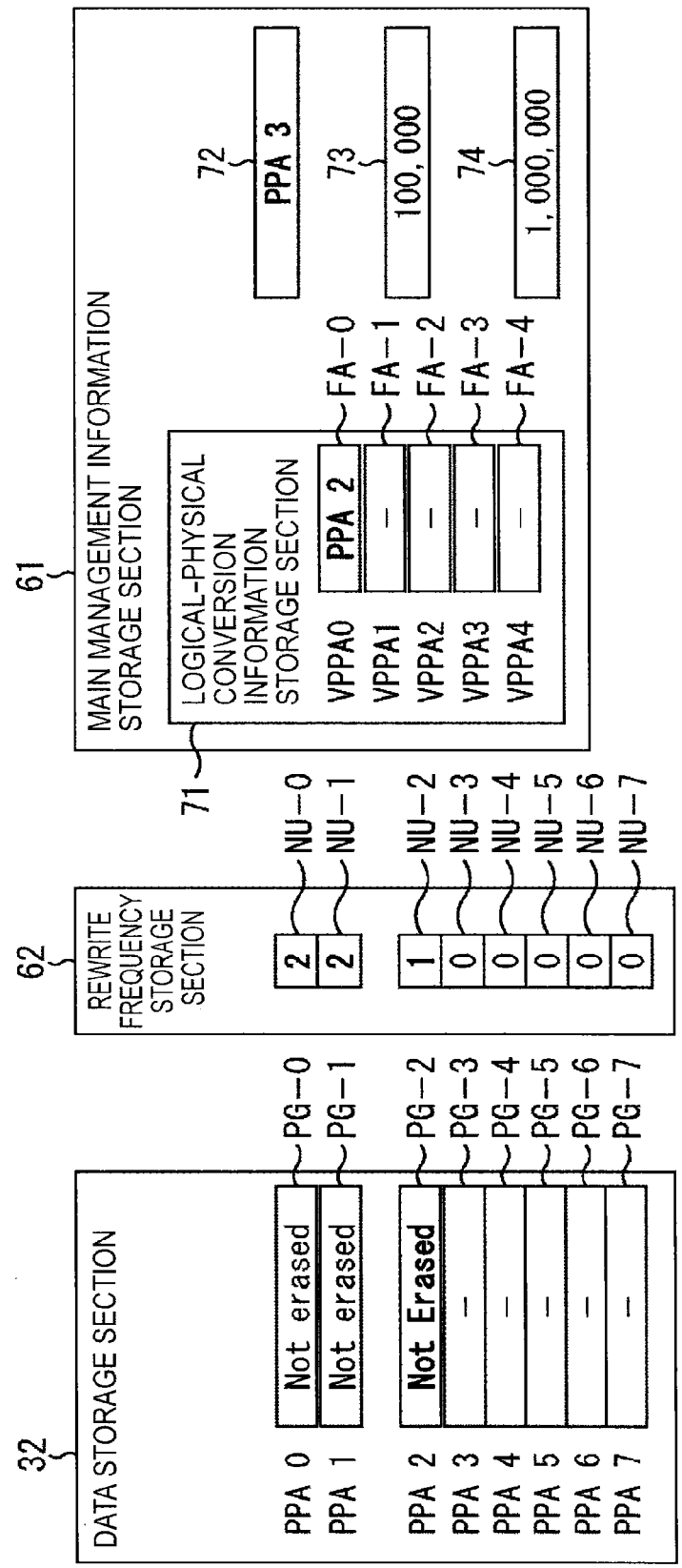
FIG. 8 is a diagram illustrating an update of the management information.

Thereby, the page PG-2 specified by the physical page number PPA2 is in a state in which data has been written as illustrated in FIG. 8. In FIG. 8, text "Not Erased" is described in the page PG-2 and the page PG-2 is in a state in which data has been stored.

In step S12, the rewrite frequency management section 105 updates a rewrite frequency by incrementing a rewrite frequency of the page PG-2 of which a physical page number in which data has been written is PPA2. That is, the rewrite frequency management section 105 increments the rewrite frequency stored in the frequency information storage section NU-2 corresponding to the page PG-2 by 1.

Thereby, the rewrite frequency of the page PG-2 stored in the frequency information storage section NU-2 is changed from the state illustrated in FIG. 6, that is, the rewrite frequency "0," to the state illustrated in FIG. 8, that is, the rewrite frequency "1."

Thereby, if new data is written to the empty page and the rewrite frequency of the page is updated as described above, then a virtual page number (virtual page address) is allocated to the page to which the data has been written.

That is, in step S13, the conversion information management section 102 allocates the virtual page number to the page to which the data has been written.

For example, the initial state of FIG. 6 is a state in which a physical page number is not stored in any physical page number storage section FA of the logical-physical conversion information storage section 71 and no virtual page number is previously allocated.

Therefore, the conversion information management section 102 allocates the virtual page number VPPA0 having the smallest number to the page PG-2 to which data has been written.

Specifically, the conversion information management section 102 sets PPA2 to the physical page number corresponding to the virtual page number VPPA0 by writing the physical page number PPA2 of the page PG-2 to the physical page number storage section FA-0 corresponding to the virtual page number VPPA0. Thereby, the physical page number storage section FA-0 to which no physical page number has been written in the initial state of FIG. 6 is in a state in which the physical page number PPA2 has been written as illustrated in FIG. 8.

Thereby, when data is written to the page PG-2, which has previously been an empty page, the empty page search section 103 searches for a new empty page.

That is, in step S14, the empty page search section 103 searches for a new empty page, and updates a physical page number stored in the empty physical page number storage section 72.

Specifically, the empty page search section 103 increments the physical page number stored in the empty physical page number storage section 72 by 1, and ends the increment when the page PG specified by the physical page number after the increment is an empty page. Therefore, at this time, the physical page number stored in the physical page number storage section 72 is a physical page number of an empty page after the update.

Here, it is possible to specify whether the page PG of the incremented physical page number is an empty page by referring to logical-physical conversion information. In each physical page number storage section FA of the logical-physical conversion information storage section 71, the physical page number of the page PG to which a virtual page number has been allocated is stored. Therefore, a page PG of which no physical page number is stored in the physical page number storage section FA and in which no main management information is stored is supposed to be an empty page.

By incrementing the physical page number, it is possible to search for an empty page of a physical page number which is greater than a physical page number previously stored in the empty physical page number storage section 72 and is nearest to the physical page number of the empty physical page number storage section 72.

Because the physical page number PPA2 is stored in the empty physical page number storage section 72 in the initial state illustrated in FIG. 6, the empty page search section 103 increments the physical page number PPA2 by 1 and the physical page number PPA3 is set as illustrated in FIG. 8.

In this case, the physical page number PPA3 after the increment is not stored in each physical page number storage section FA of the logical-physical conversion information storage section 71 of FIG. 8. In addition, a storage position of the main management information is pages PG of the physical page numbers PPA0 and PPA1, and no main management information is stored in the physical page number PPA3. That is, the physical page number PPA3 is an empty page in which no effective data is stored.

Therefore, the empty page search section 103 stops the increment of the physical page number and sets the physical page number PPA3 in which no data is allocated as the physical page number stored in the empty physical page number storage section 72.

Also, when the physical page number stored in the empty physical page number storage section 72 is incremented, the physical page number before the increment is the last physical page number. In this case, the incremented physical page number is the smallest first physical page number. For example, because the last physical page number is "PPA7" and the first physical page number is "PPA0" in FIG. 6, the physical page number after the increment is the physical page number PPA0 when the increment on the physical page number PPA7 is performed.

Figure 7:
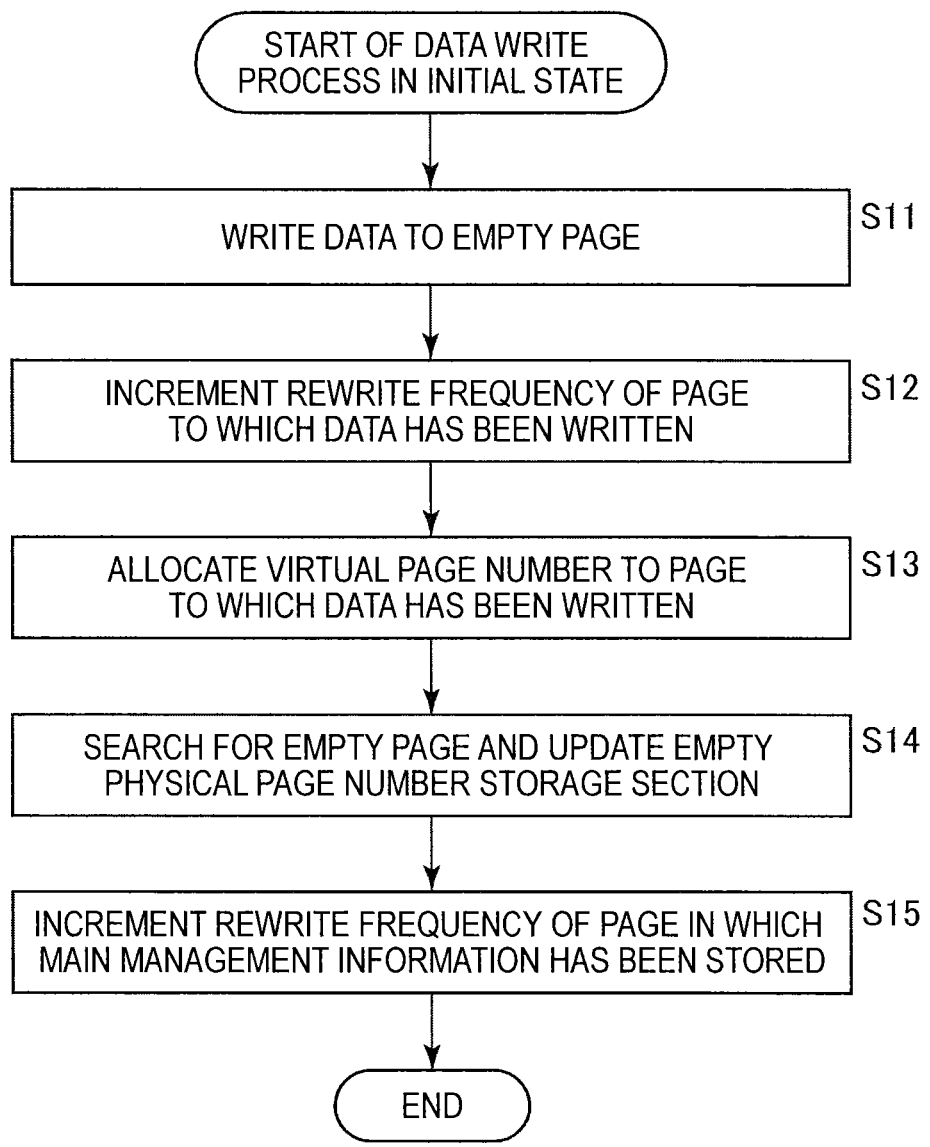
FIG. 7 is a flowchart illustrating a data write process in the initial state.

Returning to the description of the flowchart of FIG. 7, because data of the page PG serving as the main management information storage section 61 has been updated according to the process of steps S13 and S14, a rewrite frequency of the page PG is updated.

That is, in step S15, the rewrite frequency management section 105 increments rewrite frequencies of the pages PG-0 and PG-1 specified by the physical page numbers PPA0 and PPA1 in which main management information is stored by 1.

Thereby, the rewrite frequencies stored in the frequency information storage sections NU-0 and NU-1 are incremented by 1 and updated from a rewrite frequency "1" in the initial state of FIG. 6 to a rewrite frequency "2" as illustrated in FIG. 8.

When the rewrite frequency of the page PG of a storage destination of main management information is updated, the data write process in the initial state ends. At this time, states of the data storage section 32, the rewrite frequency storage section 62, and the main management information storage section 61 are changed from the states illustrated in FIG. 6 to the states illustrated in FIG. 8.

In the example of FIG. 8, data is written to the page PG-2 of the physical page number PPA2, and the virtual page number VPPA0 is allocated to the page PG-2. In addition, the physical page number PPA3 of a new empty page is stored in the empty physical page number storage section 72, and the rewrite frequencies stored in the frequency information storage sections NU-0, NU-1, and NU-2 of pages PG in which data has been written or updated are incremented.

As described above, when the information processing system holds the rewrite frequency for every page PG and writing of data for the page PG is performed, the rewrite frequency of the page PG is updated.

As described above, it is possible to average the rewrite frequency of each page PG and extend the life of the main memory 12 by holding the rewrite frequency for every page PG and moving data to another page PG if necessary. In addition, it is possible to further reduce the rewrite frequency of each page PG and extend the life of the main memory 12 by providing an area in which the rewrite frequency of each page PG is held separately from the page PG in which other data is held.

[Description of Data Write Process when No Main Management Information is Updated]

In addition, if the CPU 21 further instructs the main memory management control section 22 to designate the virtual page number VPPA0 and write data from the state illustrated in FIG. 8, a data write process is started when no main management information is updated.

Figure 9:
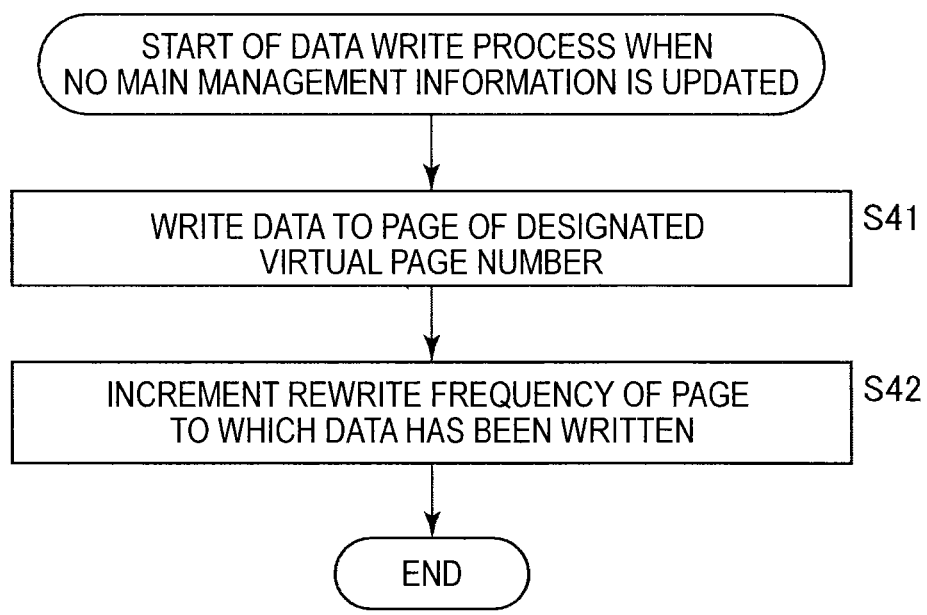
FIG. 9 is a flowchart illustrating a data write process when no main management information is updated.

Hereinafter, the data write process when the information processing system does not update main management information will be described with reference to the flowchart of FIG. 9 and FIG. 10.

In step S41, the data processing section 101 writes data supplied from the CPU 21 to the page PG specified by the virtual page number VPPA0 specified by the CPU 21. For example, in the state illustrated in FIG. 8, the physical page number PPA2 is stored in the physical page number storage section FA-0 corresponding to the virtual page number VPPA0. Therefore, the data processing section 101 writes data to the page PG-2 specified by the physical page number PPA2.

In step S42, the rewrite frequency management section 105 updates the rewrite frequency by incrementing the rewrite frequency of the page PG-2 of the physical page number PPA2 in which data has been written. That is, the rewrite frequency management section 105 increments the rewrite frequency stored in the frequency information storage section NU-2 corresponding to the page PG-2 by 1.

Figure 10:
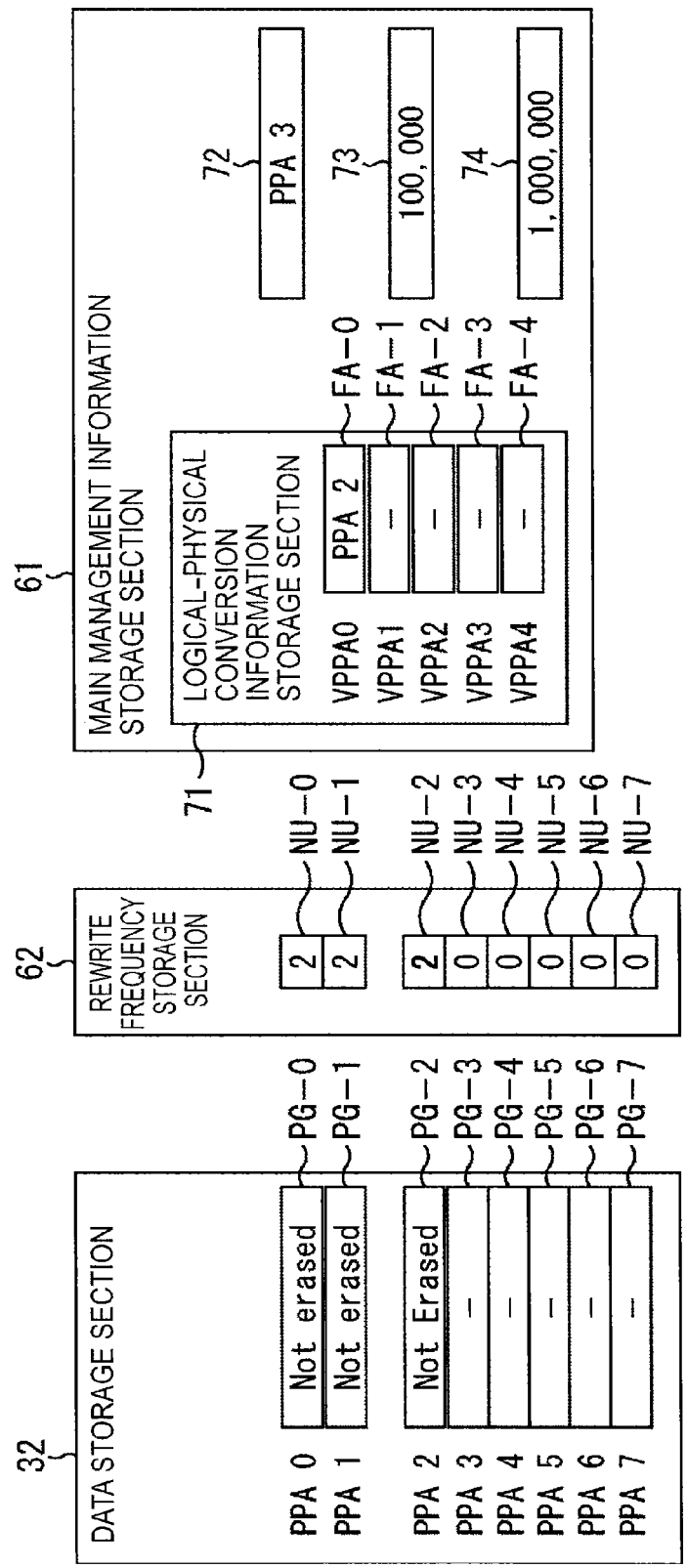
FIG. 10 is a diagram illustrating an update of management information.

The states of the data storage section 32 and the rewrite frequency storage section 62 are changed from the states illustrated in FIG. 8 to the states illustrated in FIG. 10 according to the above-described data writing and rewrite frequency increment. In FIG. 10, an update of data stored in the page PG-2 from the state illustrated in FIG. 8 is performed and the rewrite frequency stored in the frequency information storage section NU-2 according to the update is incremented by 1 from "1" to "2."

Also, in this case, because no main management information is rewritten, the rewrite frequencies of the pages PG-0 and PG-1 in which the main management information is stored are not updated.

If data is written to the page PG of the designated virtual page number and the rewrite frequency of the page PG is updated, the data write process ends when no main management information is updated.

Thereby, if a virtual page number is designated and an instruction for writing data is issued, the information processing system writes data to a page PG specified by the virtual page number and increments the rewrite frequency. At this time, when no main management information is rewritten, the rewrite frequency of the page PG in which the main management information is stored is maintained without being updated.

[Description of Data Write Process when Rewrite Frequency has Reached Threshold Value]

Further, it is assumed that data is frequently written to a page PG-2 from the state illustrated in FIG. 10 and the rewrite frequency of the page PG-2 reaches the threshold value th.

Figure 11:
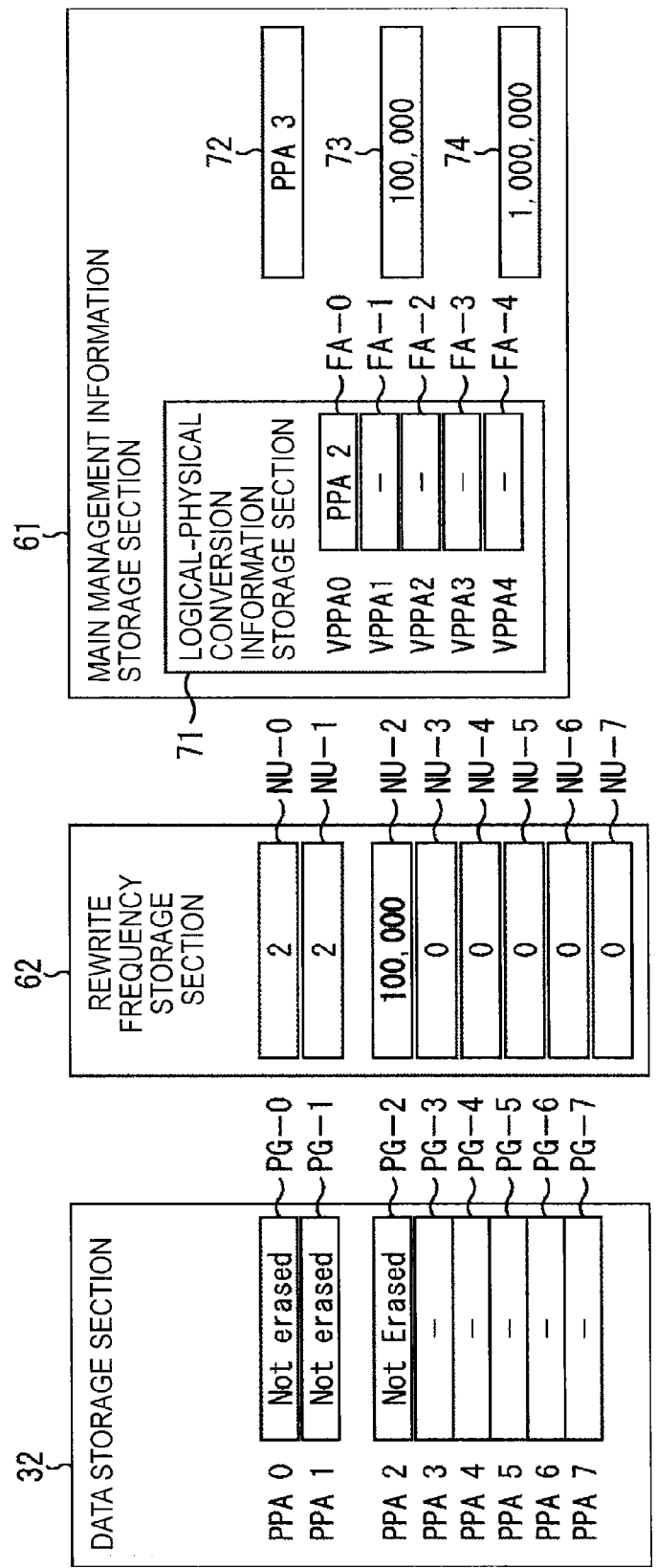
FIG. 11 is a diagram illustrating an example of management information in which a rewrite frequency of a page has reached a threshold value.

In this case, the states of the data storage section 32 and the rewrite frequency storage section 62 are changed from the states illustrated in FIG. 10 to the states illustrated in FIG. 11. In FIG. 11, the rewrite frequency stored in the frequency information storage section NU-2 is the same numerical value "100000" as the threshold value th stored in the threshold value storage section 73.

If the same virtual page number VPPA0 is further designated and an instruction for writing of data is issued when the rewrite frequency of the page PG-2 specified by the virtual page number VPPA0 has reached the threshold value th, the data write process when the rewrite frequency has reached the threshold value is started.

Hereinafter, the data write process by the information processing system when the rewrite frequency has reached the threshold value will be described with reference to the flowchart of FIG. 12 and FIG. 13.

In step S71, the data processing section 101 writes data supplied from the CPU 21 to an empty page specified by the physical page number PPA3 stored in the empty physical page number storage section 72, that is, a page PG-3.

For example, when the CPU 21 designates the virtual page number VPPA0 and issues a data write instruction in the state illustrated in FIG. 11, the data processing section 101 refers to the physical page number storage section FA-0 corresponding to the virtual page number VPPA0 of the logical-physical conversion information storage section 71.

In FIG. 11, it can be seen that an instruction for writing data to the page PG-2 specified by the physical page number PPA2 of the data storage section 32 has been issued because the physical page number PPA2 has been stored in the physical page number storage section FA-0.

Subsequently, the data processing section 101 compares the rewrite frequency "100000" stored in the frequency information storage section NU-2 of the page PG-2, which is a write destination of data in FIG. 11, to a value "100000" of the threshold value th stored in the threshold value storage section 73. Because the comparison result between the rewrite frequency and the threshold value th indicates that the rewrite frequency of the page PG-2 reaches the threshold value th, it is difficult to write data to the page PG-2.

Therefore, the data processing section 101 stores data supplied from the CPU 21 in an empty page instead of the page PG-2. That is, the data processing section 101 refers to the empty physical page number storage section 72 and writes the data supplied from the CPU 21 to the page PG-3 specified by the physical page number PPA3 stored therein.

Figure 13:
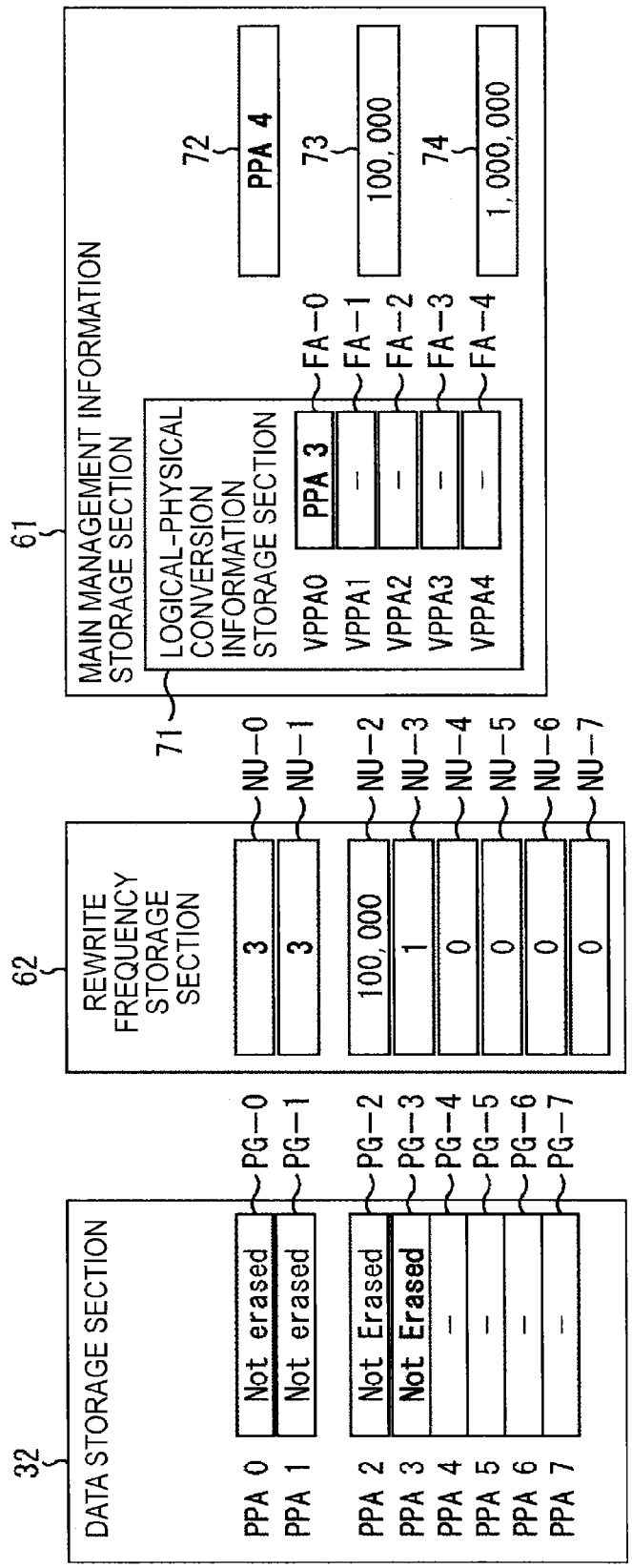
FIG. 13 is a diagram illustrating an update of management information.

Thereby, a change is made from a state in which no data is stored in the page PG-3 of the physical page number PPA3 as illustrated in FIG. 11 to a state in which data has been stored in the page PG-3 of the physical page number PPA3 as illustrated in FIG. 13. In FIG. 13, text "Not Erased" is described in the page PG-3 and the page PG-3 is in a state in which data has been written.

In step S72, the rewrite frequency management section 105 increments a rewrite frequency of the page PG-3, which has the physical page number in which data has been written. That is, the rewrite frequency management section 105 increments the rewrite frequency stored in the frequency information storage section NU-3 corresponding to the page PG-3 by 1.

Thereby, the rewrite frequency of the page PG-3 stored in the frequency information storage section NU-3 is changed from the state illustrated in FIG. 11, that is, the rewrite frequency "0," to the state illustrated in FIG. 13, that is, the rewrite frequency "1."

Thereby, if data is written to the empty page and the rewrite frequency of the page is updated, then a virtual page number (virtual page address) is allocated to a page to which data has been written.

That is, in step S73, the conversion information management section 102 allocates the virtual page number to the page to which the data has been written.

For example, in step S71, an instruction for writing data to the virtual page number VPPA0 is issued. Incidentally, because it is difficult to currently write data to the page PG-2 specified by the virtual page number VPPA0, designated data is written to the page PG-3, which is an empty page. Therefore, it is necessary to change allocation of the virtual page number VPPA0 so that the virtual page number VPPA0 is allocated to the page PG-3 to which the data has been written.

Therefore, the conversion information management section 102 allocates the virtual page number VPPA0 designated by the CPU 21 as a data write destination to the page PG-3 to which the data has been actually written.

Specifically, the conversion information management section 102 changes the allocation of the virtual page number VPPA0 by writing the physical page number PPA3 of the page PG-3 to the physical page number storage section FA-0 corresponding to the virtual page number VPPA0.

Thereby, the physical page number stored in the physical page number storage section FA-0 corresponding to the virtual page number VPPA0 is changed from the state illustrated in FIG. 11 to the state illustrated in FIG. 13. That is, the physical page number stored in the physical page number storage section FA-0 is changed from the physical page number PPA2 to the physical page number PPA3.

In step S74, the empty page search section 103 searches for a new empty page and updates a physical page number stored in the empty physical page number storage section 72. In step S74, the same process as in step S14 of FIG. 7 is performed.

Specifically, the empty page search section 103 searches for the new empty page by incrementing the physical page number stored in the empty physical page number storage section 72 by 1. For example, because the physical page number PPA3 is stored in the empty physical page number storage section 72 in the state illustrated in FIG. 11, the empty page search section 103 increments the physical page number PPA3 by 1 and the physical page number PPA4 is set as illustrated in FIG. 13.

In FIG. 13, the physical page number PPA4 after the increment is not stored in each physical page number storage section FA of the logical-physical conversion information storage section 71. In addition, a storage position of the main management information is pages PG of the physical page numbers PPA0 and PPA1, and no main management information is stored in the physical page number PPA4. That is, the physical page number PPA4 is an empty page in which no effective data is stored.

Therefore, the empty page search section 103 stops the increment of the physical page number and sets the physical page number PPA4 in which no data is allocated as the physical page number stored in the empty physical page number storage section 72.

Figure 12:
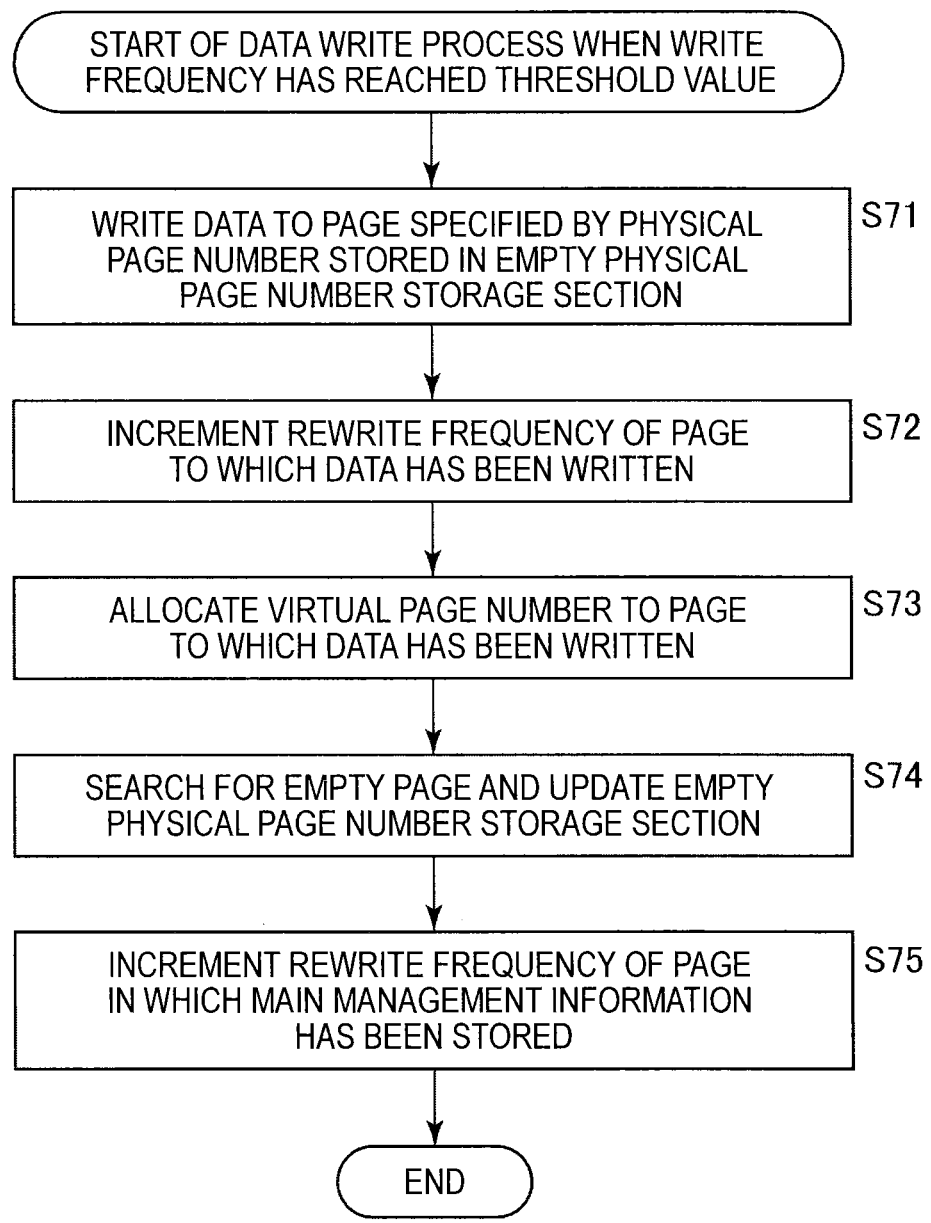
FIG. 12 is a flowchart illustrating a data write process when the rewrite frequency has reached the threshold value.

Returning to the description of the flowchart of FIG. 12, because data of the page PG serving as the main management information storage section 61 has been updated according to the process of steps S73 and S74, the rewrite frequency of the page PG is updated.

That is, in step S75, the rewrite frequency management section 105 increments rewrite frequencies of the pages PG-0 and PG-1 specified by the physical page numbers PPA0 and PPA1 in which main management information is stored by 1.

Thereby, the rewrite frequencies stored in the frequency information storage sections NU-0 and NU-1 are incremented by 1 and updated from a rewrite frequency "2" of the state illustrated in FIG. 11 to a rewrite frequency "3" as illustrated in FIG. 13.

If the rewrite frequency of the page PG of a storage destination of main management information is updated, the data write process ends when the rewrite frequency reaches a threshold value. At this time, states of the data storage section 32, the rewrite frequency storage section 62, and the main management information storage section 61 are changed from the states illustrated in FIG. 11 to the states illustrated in FIG. 13.

In the example of FIG. 13, data is written to the page PG-3 of the physical page number PPA3, and the virtual page number VPPA0 is allocated to the page PG-3. In addition, the physical page number PPA4 of a new empty page is stored in the empty physical page number storage section 72, and the rewrite frequencies stored in the frequency information storage sections NU-0, NU-1, and NU-3 of pages PG in which data has been written or updated are incremented.

Also, in FIG. 13, no physical page number PPA2 is stored in each physical page number storage section FA of the logical-physical conversion information storage section 71, and no main management information is stored in the page PG-2 of the physical page number PPA2. Therefore, in the state illustrated in FIG. 13, the page PG-2 is an empty page in which no effective data is stored.

As described above, if data has been written to a predetermined page PG, the information processing system writes data to an empty page in which no effective data is stored and the rewrite frequency does not reach the threshold value th when the rewrite frequency of the page PG has reached the threshold value th. Therefore, the information processing system changes the allocation of the virtual page number according to the writing of the data.

As described above, it is possible to average the rewrite frequency of each page PG and improve the use efficiency of the nonvolatile main memory 12 having the upper limit in the rewrite frequency by writing data to another page PG when the rewrite frequency of the page PG has reached the threshold value th. Thereby, it is possible to extend the life of the main memory 12 and consequently extend the life of the information processing system using the main memory 12.

[Description of Data Write Process when Rewrite Frequencies of Data Storage Position and Empty Page have Reached Threshold Value]

In addition, it is assumed that data is written to each page PG from the state illustrated in FIG. 13, then data is frequently written to the page PG-3, and the rewrite frequency of the page PG-3 reaches the threshold value th.

In this case, the states of the data storage section 32, the rewrite frequency storage section 62, and the main management information storage section 61 are changed to the states illustrated in FIG. 4.

Figure 14:
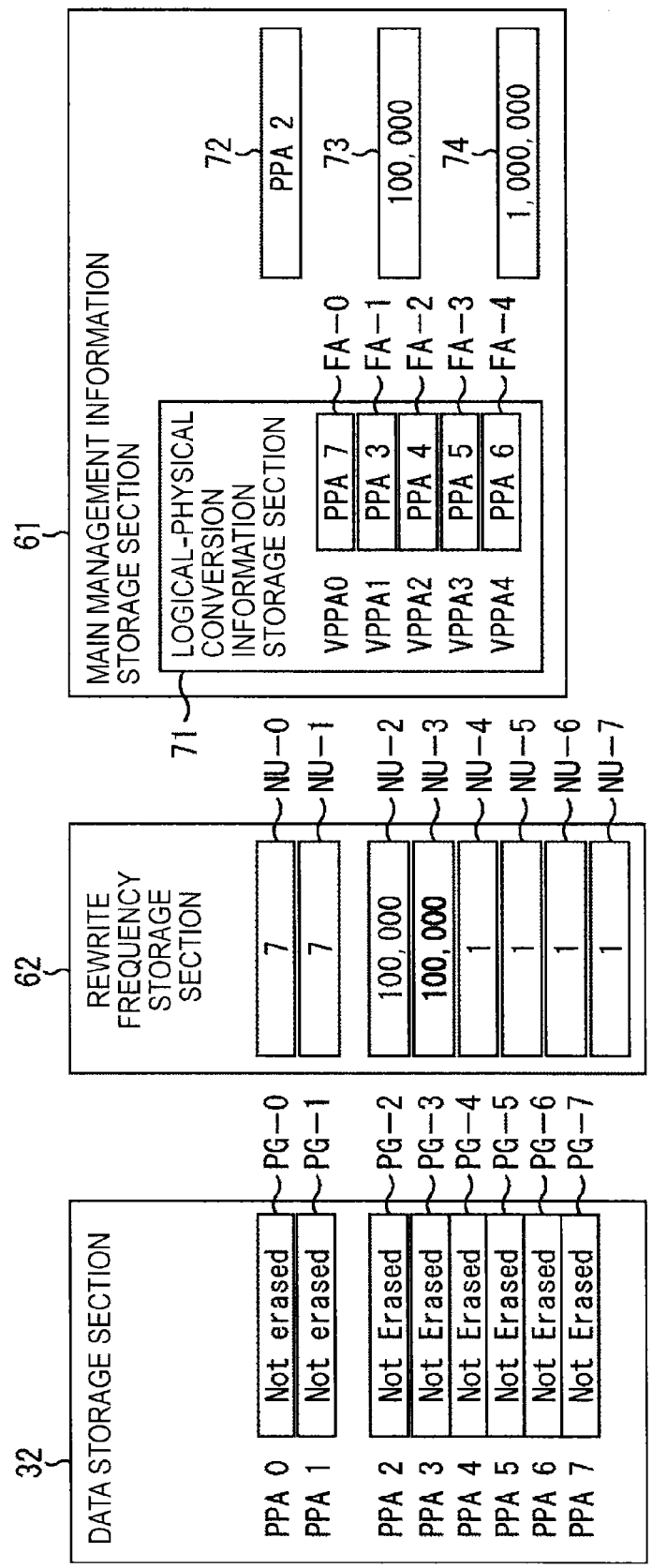
FIG. 14 is a diagram illustrating an example of management information in which rewrite frequencies of a data storage position and an empty page have reached the threshold value in a state in which a virtual page number is already allocated.

In FIG. 14, a physical page number PPA7 and physical page numbers PPA3 to PPA6 are stored in the physical page number storage sections FA-0 to FA-4 of the logical-physical conversion information storage section 71. That is, all the virtual page numbers VPPA0 to VPPA4 are already allocated to the pages PG.

In other words, a state in which the page PG serving as the empty page among all the pages PGs is only the page PG of the physical page number stored in the empty physical page number storage section 72 is reached.

In addition, the rewrite frequency of the page PG-3 having the physical page number of PPA3 to which the virtual page number VPPA1 has been allocated, that is, the rewrite frequency stored in the frequency information storage section NU-3, is the same numerical value "100000" as the threshold value th stored in the threshold value storage section 73.

Likewise, the rewrite frequency of the page PG-2 having the physical page number of PPA2 stored in the empty physical page number storage section 72, that is, the rewrite frequency stored in the frequency information storage section NU-2, is the same numerical value as the threshold value th stored in the threshold value storage section 73.

In the above-described state, the virtual page number VPPA1 is designated and a data write instruction is issued. That is, it is assumed that the data write instruction is issued in a state in which all virtual page numbers are already allocated, there is no other page PG serving as an empty page, and the rewrite frequencies of the data storage destination and the empty page, that is, the pages PG-3 and PG-2, reach the threshold value th.

In this case, in the information processing system, the data write process is performed when the rewrite frequencies of the data storage position and the empty page have reached the threshold value.

Hereinafter, the data write process in the information processing system when the rewrite frequencies of the data storage position and the empty page have reached the threshold value will be described with reference to the flowchart of FIG. 15 and FIGS. 16 and 17.

In step S101, the data processing section 101 searches for a page PG having a lowest rewrite frequency by referring to the frequency information storage section NU of the rewrite frequency storage section 62.

For example, when the CPU 21 designates the virtual page number VPPA1 and issues the data write instruction in the state illustrated in FIG. 14, the data processing section 101 refers to the physical page number storage section FA-1 corresponding to the virtual page number VPPA-1 of the logical-physical conversion information storage section 71.

In FIG. 14, it can be seen that an instruction for writing data to the page PG-3 specified by the physical page number PPA3 of the data storage section 32 has been issued because the physical page number PPA3 has been stored in the physical page number storage section FA-1.

Subsequently, the data processing section 101 compares the rewrite frequency "100000" stored in the frequency information storage section NU-3 of the page PG-3, which is a write destination of data in FIG. 14, to a value "100000" of the threshold value th stored in the threshold value storage section 73. Because the comparison result between the rewrite frequency and the threshold value th indicates that the rewrite frequency of the page PG-3 reaches the threshold value th, it is difficult to write data to the page PG-3.

Therefore, the data processing section 101 refers to the empty physical page number storage section 72, and specifies the page PG-2 corresponding to the physical page number PPA2 stored therein. Therefore, the data processing section 101 compares the rewrite frequency "100000" stored in the frequency information storage section NU-2 of the page PG-2 to a value "100000" of the threshold value th stored in the threshold value storage section 73. Because the comparison result between the rewrite frequency and the threshold value th indicates that the rewrite frequency of the page PG-2 reaches the threshold value th, it is difficult to write data to the page PG-2.

Further, a state in which effective data has also already been stored in all other pages PG excluding the pages PG-2 and PG-3 is reached.

As described above, a page PG to which data is writable serving as a new empty page is searched for when it is difficult to write data to the page PG-2 secured as the empty page as well as the page PG-3 corresponding to the designated virtual page number VPPA1.

That is, the data processing section 101 refers to the frequency information storage section NU of the rewrite frequency storage section 62 and searches for a page PG having a lowest frequency as a new empty page from among all the pages PG.

Also, in further detail, it is necessary that the rewrite frequency of the page PG serving as the new empty page be less than the threshold value th. In addition, if the rewrite frequency of the page PG serving as the new empty page is less than the threshold value th, the page PG may not be the page PG having the lowest rewrite frequency.

In the example of FIG. 14, pages having the lowest rewrite frequency stored in the frequency information storage section NU are pages PG-4 to PG-7 having the rewrite frequency of "1." For example, the data processing section 101 selects the page PG-4 having the smallest physical page number as the page PG serving as the new empty page from among the pages PG. The rewrite frequency of the page PG-4 is less than the threshold value th, and data is writable thereto.

In step S102, the data processing section 101 copies (moves) data stored in the page PG-4 specified by the physical page number PPA4 obtained as the search result to the page PG-2 currently secured as the empty page.

Thereby, the page PG-4 having the lowest rewrite frequency is set to be available as the new empty page by copying the data of the page PG-4 to the page PG-2, which is currently the empty page.

In step S103, the rewrite frequency management section 105 increments the rewrite frequency of the page PG-2 having a physical page number of PPA2 to which data has been written (copied). That is, the rewrite frequency management section 105 increments the rewrite frequency stored in the frequency information storage section NU-2 corresponding to the page PG-2 by 1.

Figure 16:
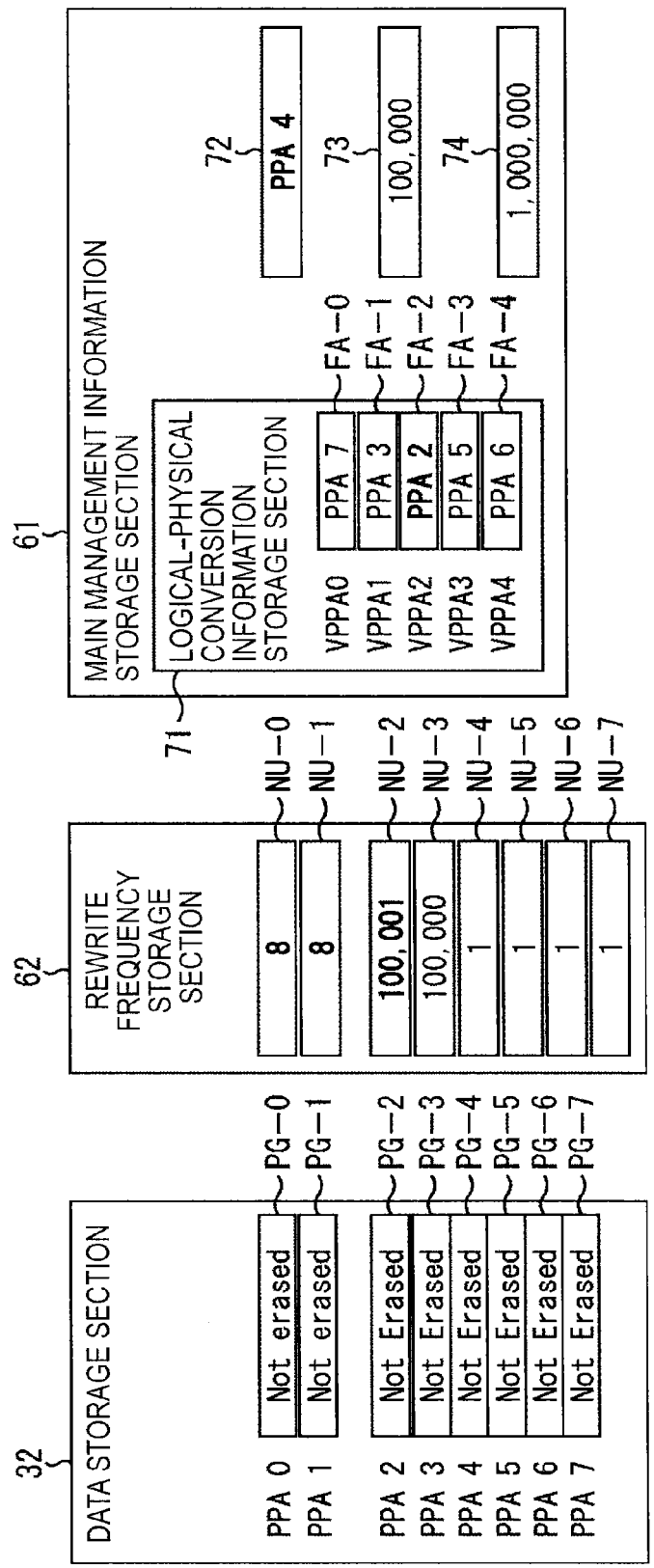
FIG. 16 is a diagram illustrating an update of management information.

Thereby, the rewrite frequency of the page PG-2 stored in the frequency information storage section NU-2 is changed from the state illustrated in FIG. 14, that is, the rewrite frequency "100000," to the state illustrated in FIG. 16, that is, the requite frequency "100001."

Thereby, when data of the page PG serving as the empty page is currently copied to the empty page and the rewrite frequency of the page PG of the copy destination is updated, the virtual page number of the copy source of the data is allocated to the page PG of the copy destination.

That is, in step S104, the conversion information management section 102 changes the allocation of the virtual page number for the page PG to which data has been copied.

For example, in the example of FIG. 14, data of the page PG-4 to which the virtual page number VPPA2 has been allocated is copied to the page PG-2, which is currently the empty page, so as to set the page PG-4 to the empty page. Therefore, it is necessary to change an allocation destination of the virtual page number VPPA2 from the current page PG-4 to the page PG-2 according to the copy of data.

Therefore, the conversion information management section 102 writes the physical page number PPA2 of the page PG-2 to the physical page number storage section FA-2 corresponding to the virtual page number VPPA2.

Thereby, the physical page number stored in the physical page number storage section FA-2 corresponding to the virtual page number VPPA2 is changed from the state illustrated in FIG. 14 to the state illustrated in FIG. 16. That is, the physical page number stored in the physical page number storage section FA-2 is changed from the physical page number PPA4 to the physical page number PPA2. As a result, the allocation destination of the virtual page number VPPA2 is changed from the current page PG-4 to the page PG-2.

In step S105, the empty page search section 103 changes the physical page number stored in the empty physical page number storage section 72 to the physical page number of the page PG serving as a new empty page.

Thereby, the physical page number stored in the empty physical page number storage section 72 is rewritten from the state illustrated in FIG. 14 to the state illustrated in FIG. 16. That is, the physical page number stored in the empty physical page number storage section 72 is changed from the physical page number PPA2 to the physical page number PPA4.

In step S106, the rewrite frequency management section 105 increments the rewrite frequencies of the pages PG-0 and PG-1 specified by the physical page numbers PPA0 and PPA1 in which main management information is stored by 1.

Thereby, the rewrite frequencies stored in the frequency information storage sections NU-0 and NU-1 are incremented by 1, and changed from a rewrite frequency "7" of the state illustrated in FIG. 14 to a rewrite frequency "8" as illustrated in FIG. 16.

According to the above-described process of steps S101 to S106, the states of the data storage section 32, the rewrite frequency storage section 62, and the main management information storage section 61 are changed from the states illustrated in FIG. 14 to the states illustrated in FIG. 16.

In the example of FIG. 16, data stored in the page PG-4 of the physical page number PPA4 is copied to the page PG-2 of the physical page number PPA2, and the allocation destination of the virtual page number VPPA2 is changed from the page PG-4 to the page PG-2.

In addition, the physical page number PPA4 of the new empty page is stored in the empty physical page number storage section 72, and the rewrite frequencies stored in the frequency information storage sections NU-0, NU-1, and NU-2 of the page PG in which data has been written or updated are incremented.

Because the page PG-4 having the rewrite frequency less than the threshold value th can be secured as the new empty page according to the above process, data of a write instruction by the CPU 21 is written to the page PG-4.

That is, in step S107, the data processing section 101 writes data supplied from the CPU 21 to an empty page specified by the physical page number PPA4 stored in the empty physical page number storage section 72, that is, the page PG-4.

Data of a write instruction by the CPU 21 should be originally written to the page PG-3 corresponding to the designated virtual page number VPPA1. However, because the rewrite frequency of the page PG-3 already reaches the threshold value th as described above, data is written to the page PG4 newly secured as the empty page.

In step S108, the rewrite frequency management section 105 increments the rewrite frequency of the page PG-4 having a physical page number of PPA4 to which data has been written. That is, the rewrite frequency management section 105 increments the rewrite frequency stored in the frequency information storage section NU-4 corresponding to the page PG-4 by 1.

Figure 17:
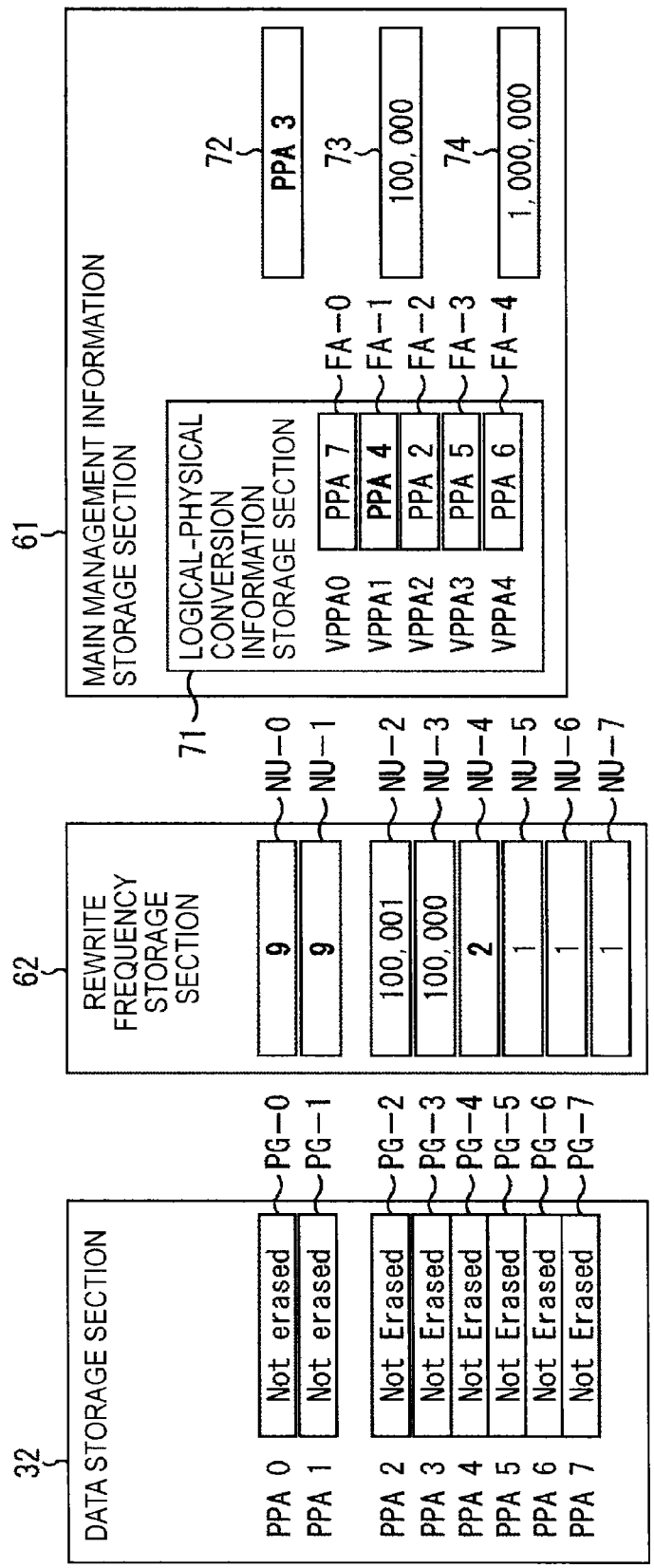
FIG. 17 is a diagram illustrating an update of management information.

Thereby, the rewrite frequency of the page PG-4 stored in the frequency information storage section NU-4 is changed from the state illustrated in FIG. 16, that is, a rewrite frequency "1," to the state illustrated in FIG. 17, that is, a rewrite frequency "2."

Thereby, if data is written to the empty page and the rewrite frequency of the page is updated, then a virtual page number is allocated to a page to which data has been written.

That is, in step S109, the conversion information management section 102 allocates a virtual page number to a page to which data has been written.

For example, because data for which the virtual page number VPPA1 has been designated as the write destination has been stored in the page PG-4, which is the empty page, in step S107, the conversion information management section 102 changes the allocation destination of the virtual page number VPPA1 to the page PG-4.

Specifically, the conversion information management section 102 changes the allocation destination of the virtual page number VPPA1 from the page PG-3 to the page PG-4 by writing the physical page number PPA4 of the page PG-4 to the physical page number storage section FA-1 corresponding to the virtual page number VPPA1.

Thereby, the physical page number stored in the physical page number storage section FA-1 corresponding to the virtual page number VPPA1 is changed from the state illustrated in FIG. 16 to the state illustrated in FIG. 17. That is, the physical page number stored in the physical page number storage section FA-1 is changed from the physical page number PPA3 to the physical page number PPA4.

Thereby, when data is written to the empty page, the empty page search section 103 searches for a new empty page.

That is, in step S110, the empty page search section 103 searches for the new empty page and updates the physical page number stored in the empty physical page number storage section 72. In step S110, the same process as in step S14 of FIG. 7 is performed.

Specifically, the empty page search section 103 searches for a new empty page by incrementing the physical page number stored in the empty physical page number storage section 72 by 1. For example, because the physical page number PPA4 is stored in the empty physical page number storage section 72 in the state illustrated in FIG. 16, the empty page search section 103 increments the physical page number PPA4 and sets the physical page number PPA3 as illustrated in FIG. 17.

In this example, when the physical page number is PPA7 because effective data is stored in pages PG of the physical page numbers PPA5 to PPA7, the increment is further made and the physical page number PPA0 is set. In addition, because the effective data is also stored in the physical page numbers PPA0 to PPA2, the physical page number is set to be further incremented to PPA3.

At this time, because no effective data is stored in the physical page number PPA3, that is, because no virtual page number is allocated to the physical page number PPA3 and no main management information is stored therein, the physical page number PPA3 is a new empty page.

Figure 15:
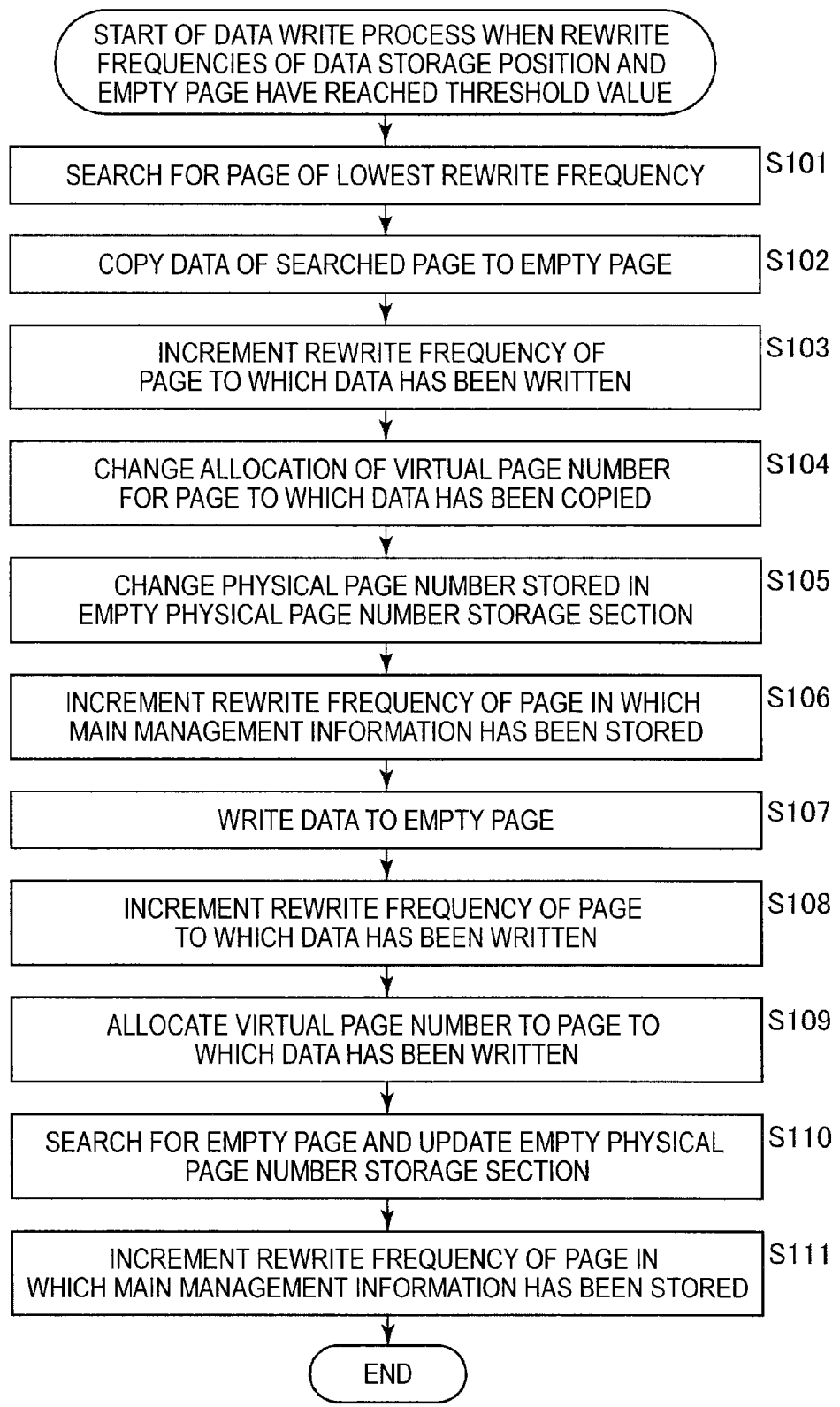
FIG. 15 is a flowchart illustrating a data write process when the rewrite frequencies of the data storage position and the empty page have reached the threshold value.

Returning to the description of the flowchart of FIG. 15, the rewrite frequency of a page PG is updated because data of the page PG serving as the main management information storage section 61 has been updated according to the process of steps S109 and S110.

That is, in step S111, the rewrite frequency management section 105 increments the rewrite frequencies of the pages PG-0 and PG-1 specified by the physical page numbers PPA0 and PPA1 in which main management information is stored by 1.

Thereby, the rewrite frequencies stored in the frequency information storage sections NU-0 and NU-1 are incremented by 1, and updated from a rewrite frequency "8" in the state illustrated in FIG. 16 to a rewrite frequency "9" as illustrated in FIG. 17.

If the rewrite frequency of the page PG of the storage destination of the main management information is updated, the data write process ends when the rewrite frequencies of the data storage position and the empty page have reached the threshold value. At this time, the states of the data storage section 32, the rewrite frequency storage section 62, and the main management information storage section 61 are changed from the states illustrated in FIG. 16 to the states illustrated in FIG. 17.

In the example of FIG. 17, data is written to the page PG-4 of the physical page number PPA4 and the virtual page number VPPA1 is allocated to the page PG-4. In addition, the physical page number PPA3 of the new empty page is stored in the empty physical page number storage section 72, and the rewrite frequencies stored in the frequency information storage sections NU-0, NU-1, and NU-4 of pages in which data has been written or updated are incremented.

As described above, when data has been written to a predetermined page PG in a state in which all virtual page numbers have already been allocated, the information processing system secures a new empty page when both the rewrite frequency of the page PG and the rewrite frequency of the empty page have reached the threshold value th. Therefore, the information processing system writes data to a newly secured empty page.

As described above, the rewrite frequencies of both the page PG to which data is to be written and the empty page have reached the threshold value th, the rewrite frequency of each page PG can be averaged by setting the page PG having the lowest rewrite frequency to a new empty page. Thereby, it is possible to improve the use efficiency of the nonvolatile main memory 12 having an upper limit in the rewrite frequency and extend the life of the main memory 12. In addition, as a result, it is also possible to extend the life of the information processing system using the main memory 12.

[Description of Threshold Value Update Process]

Figure 18:
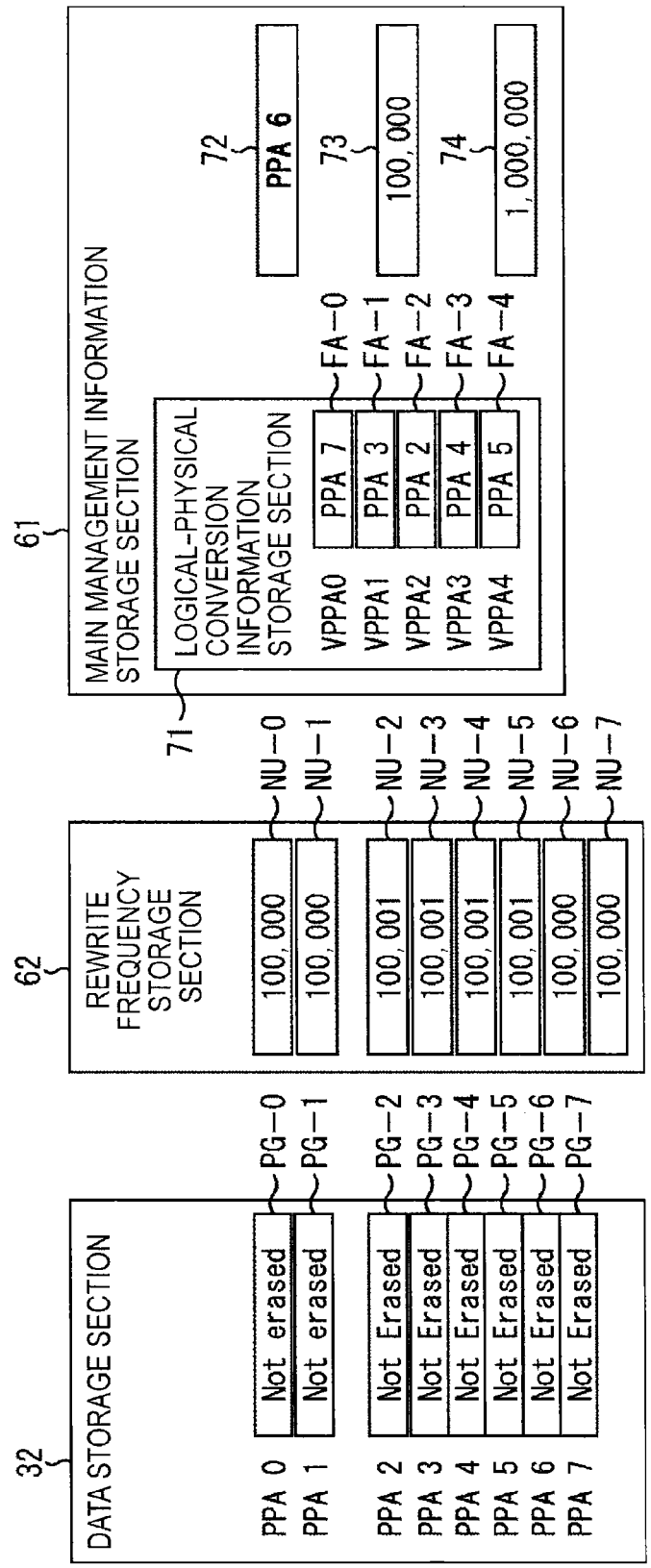
FIG. 18 is a diagram illustrating an example of management information in which rewrite frequencies of all pages have reached the threshold value.

Further, data is written to each page PG from the state illustrated in FIG. 17, rewrite frequencies of all pages PG reach the threshold value th, and the states of the data storage section 32, the rewrite frequency storage section 62, and the main management information storage section 61 become those illustrated in FIG. 18.

In FIG. 18, the rewrite frequency of each page PG stored in the frequency information storage section NU of the rewrite frequency storage section 62 becomes a value greater than or equal to the threshold value th stored in the threshold value storage section 73.

Figure 19:
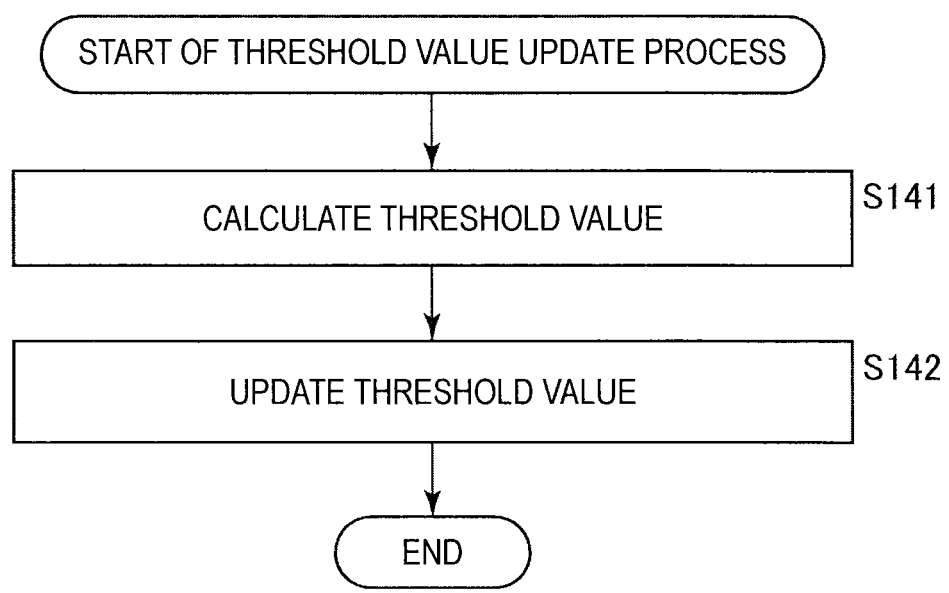
FIG. 19 is a flowchart illustrating a threshold value update process.

When the rewrite frequencies of all pages PG reach the threshold value th as described above, the information processing system performs a threshold value update process of calculating a new threshold value based on an upper limit MX of the rewrite frequency of the main memory 12 stored in the upper limit storage section 74. Hereinafter, the threshold value update process by the information processing system will be described with reference to the flowchart of FIG. 19 and FIG. 20.

In step S141, the threshold value update section 104 calculates a new threshold value th based on the upper limit MX stored in the upper limit storage section 74 and the current threshold value th stored in the threshold value storage section 73.

For example, the threshold value update section 104 calculates the new threshold value th by multiplying the upper limit MX by a predetermined constant A and adding a value obtained from the multiplication result to the current threshold value th. Here, because the threshold value th is incremented by a value corresponding to 10% of the upper limit MX, a value of the constant A is $\frac{1}{10}$.

Therefore, because the upper limit MX is "1000000" and the current threshold value th is "100000" in the example of FIG. 18, (MX×A)+th=1000000×0.1+100000=200000 and a value "200000" of the new threshold value th is calculated.

In step S142, the threshold value th is updated by storing the new threshold value th calculated by the threshold value update section 104 in the threshold value storage section 73, and the threshold value update process ends.

Figure 20:
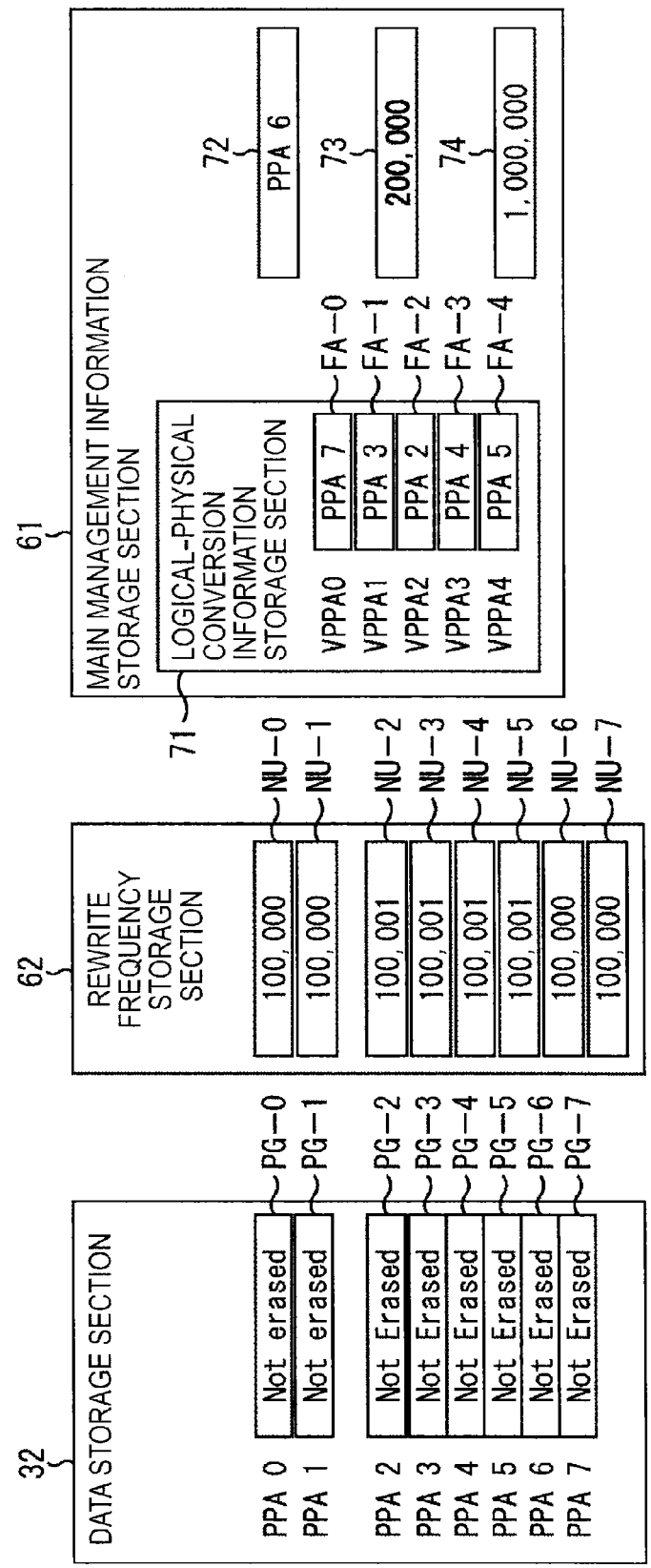
FIG. 20 is a diagram illustrating an update of management information.

For example, when the value "200000" of the new threshold value th is calculated in the state illustrated in FIG. 18, the value stored in the threshold value storage section 73 is changed from the value "100000" of the case in FIG. 18 to "200000" as illustrated in FIG. 20.

When the threshold value th is updated, then the new threshold value th is used until the rewrite frequencies of all the pages PG reach the updated new threshold value th, and each process described above is performed. Therefore, when the rewrite frequency of each page PG reaches the threshold value th, the threshold value update process is performed and the threshold value is further updated.

Thereby, when the rewrite frequency of each page PG is greater than or equal to the threshold value th, the information processing system calculates the new threshold value th based on the upper limit MX of the rewrite frequency and the current threshold value th, and updates the threshold value th. It is possible to average the rewrite frequency of each page PG and improve the use efficiency of the main memory 12 by updating the threshold value th as described above. Thereby, it is possible to extend the life of the main memory 12 or the information processing system.

Also, although an example in which the threshold value th is incremented by a value corresponding to 10% of the upper limit MX has been described above, the threshold value th may be specified in any method. For example, a value of an initial threshold value th may be a value of 50% of the upper limit MX, and the threshold value th may be set to a value of the upper limit MX according to an update of a first threshold value th. In this case, because the threshold value th is set to the upper limit MX according to the update of the first threshold value, the threshold value th is updated only once.

In addition, although an example in which areas of the data storage section 32 are managed in units of pages has been described above, rewrite frequencies may be held and managed for the areas each having a different magnitude.

Modified Example 1 of First Embodiment

Configuration of Information Processing System

In addition, although the case in which the program storage section 31 storing a program is provided within the main memory 12 has been described above, a storage position of the program to be executed by a CPU 21 may be any position not limited to within the main memory 12.

Figure 21:
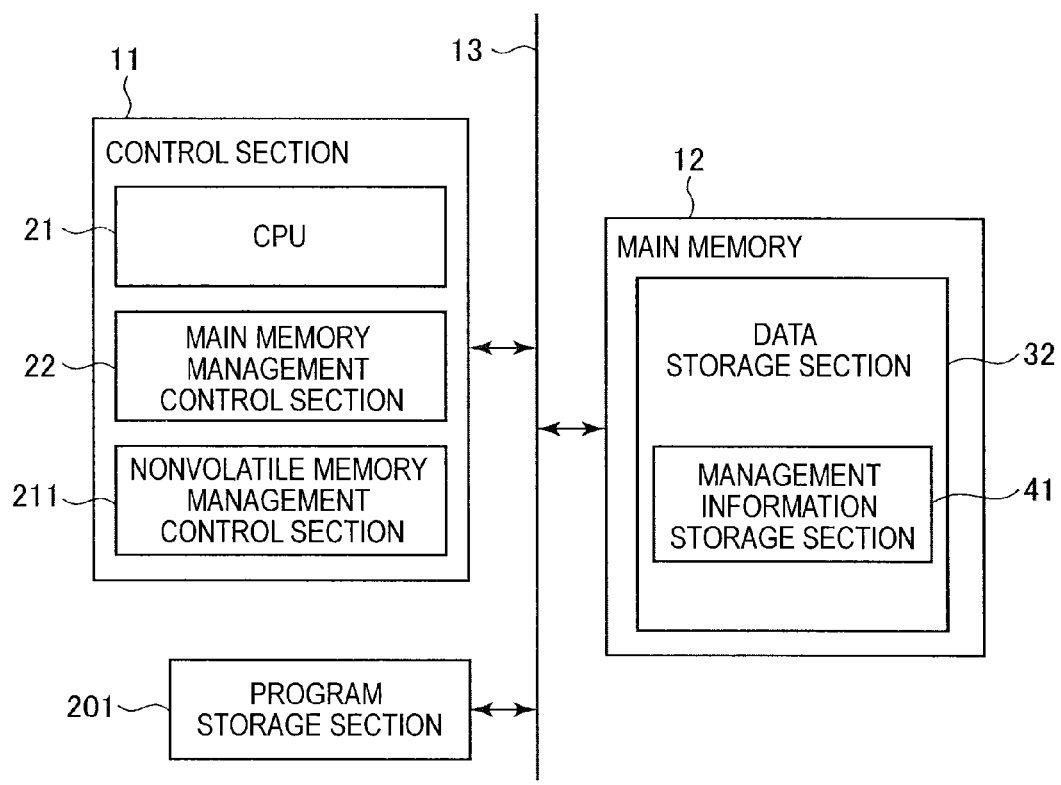
FIG. 21 is a diagram illustrating another configuration example of the information processing system.

For example, when the program is stored in another memory different from the main memory 12, the information processing system is configured as illustrated in FIG. 21. Also, parts of FIG. 21 corresponding to those of FIG. 1 are assigned the same reference signs, and description thereof is appropriately omitted.

The information processing system illustrated in FIG. 21 includes a control section 11, a main memory 12, a bus 13, and a program storage section 201. The control section 11, the main memory 12, and the program storage section 201 are mutually connected via the bus 13.

In the information processing system, no program storage area is provided and only the data storage section 32 is provided in the nonvolatile main memory 12 having the upper limit in the rewrite frequency. Therefore, a management information storage section 41 is provided in the data storage section 32.

In addition, the program storage section 201 connected to the bus 13 is the nonvolatile memory, and a program to be executed by the CPU 21 is stored in the program storage section 201.

The CPU 21, a main memory management control section 22, and a nonvolatile memory management control section 211 are provided in the control section 11, and the nonvolatile memory management control section 211 accesses the program storage section 201. That is, the nonvolatile memory management control section 211 reads the program from the program storage section 201, and the CPU 21 executes the program read by the nonvolatile memory management control section 211.

Modified Example 2 of First Embodiment

Configuration of Information Processing System

Figure 22:
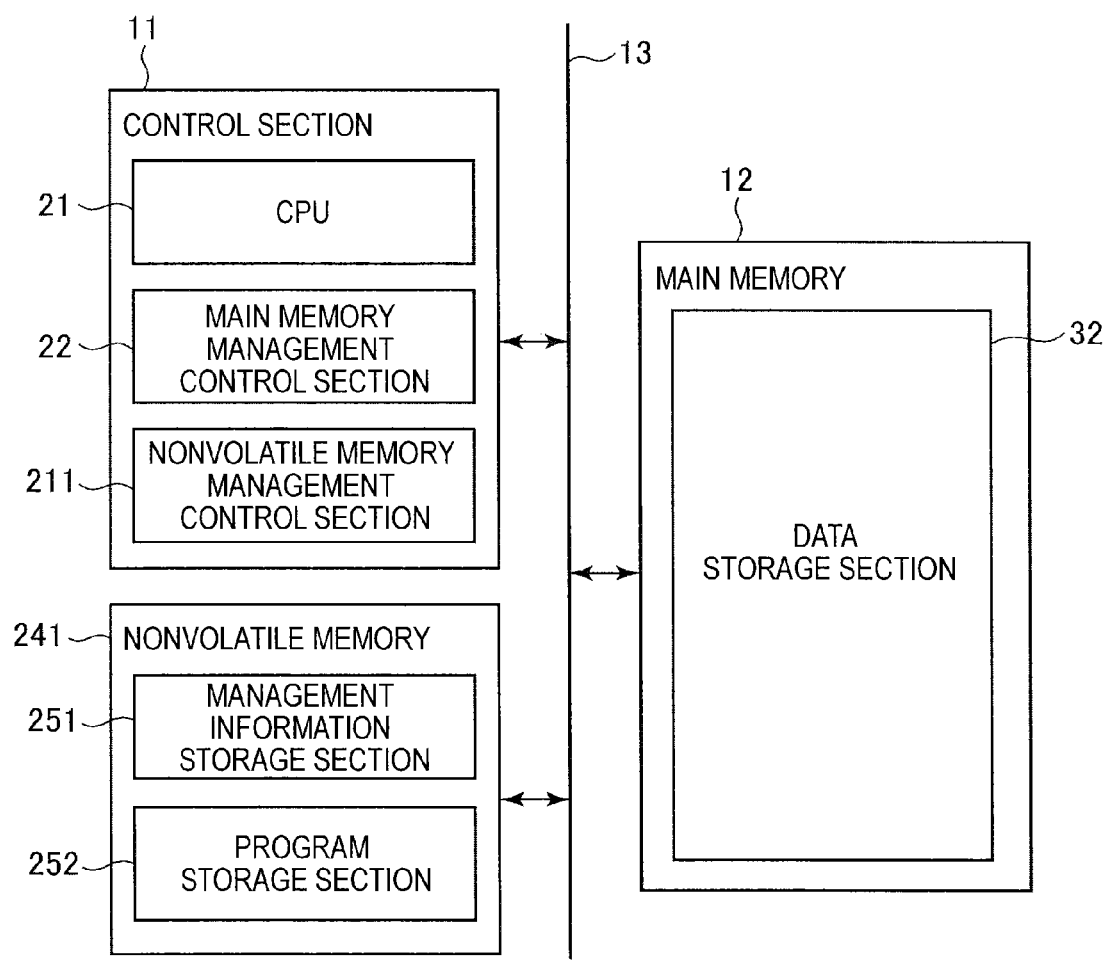
FIG. 22 is a diagram illustrating another configuration example of the information processing system.

In addition, in the information processing system, management information may be stored in a memory different from the main memory 12. In this case, the information processing system, for example, is configured as illustrated in FIG. 22. Also, parts of FIG. 22 corresponding to those of FIG. 21 are assigned the same reference signs, and description thereof is appropriately omitted.

The information processing system illustrated in FIG. 22 includes a control section 11, a main memory 12, a bus 13, and a nonvolatile memory 241. The control section 11, the main memory 12, and the nonvolatile memory 241 are mutually connected via the bus 13.

In the information processing system, no program storage area is provided and only a data storage section 32 is provided in the nonvolatile main memory 12 having an upper limit in a rewrite frequency. Therefore, in the data storage section 32, the management information of a main memory 12 is not stored, and only data to be accessed when a CPU 21 executes various processes is stored. Therefore, no management information is stored in each page PG of the data storage section 32.

In addition, the nonvolatile memory 241 connected to the bus 13 is the nonvolatile memory in which the rewrite frequency is not limited, and a management information storage section 251 and a program storage section 252 are provided in the nonvolatile memory 241.

In the management information storage section 251, management information of the main memory 12 including the above-described main management information and the rewrite frequency of each page PG of the data storage section 32 is stored. In addition, the program to be executed by the CPU 21 is stored in the program storage section 252.

In the control section 11, the CPU 21, the main memory management control section 22, and the nonvolatile memory management control section 211 are provided. In the control section 11, the main memory management control section 22 accesses the main memory 12, and the nonvolatile memory management control section 211 accesses the nonvolatile memory 241.

The nonvolatile memory management control section 211 refers to or updates management information by accessing the management information storage section 251 of the nonvolatile memory 241, and reads the program stored in the program storage section 252.

In this information processing system, functions of the conversion information management section 102 to the rewrite frequency management section 105 of FIG. 15 are provided in the nonvolatile memory management control section 211 because the nonvolatile memory management control section 211 accesses management information stored in the management information storage section 251.

In addition, in this example, because the management information is stored in the nonvolatile memory 241 in which the rewrite frequency is not limited, an object of which the rewrite frequency is averaged becomes only each page PG included in the data storage section 32 of the main memory 12.

Also, although an example in which the management information is stored in the management information storage section 251 has been described in the example of FIG. 22, only main management information among the management information may be stored in the management information storage section 251 and the rewrite frequency serving as the management information may be stored in the data storage section 32. In this case, the main management information storage section 61 is provided in the management information storage section 251, and the rewrite frequency storage section 62 is provided in the data storage section 32.

Modified Example 3 of First Embodiment

Configuration of Information Processing System

Figure 23:
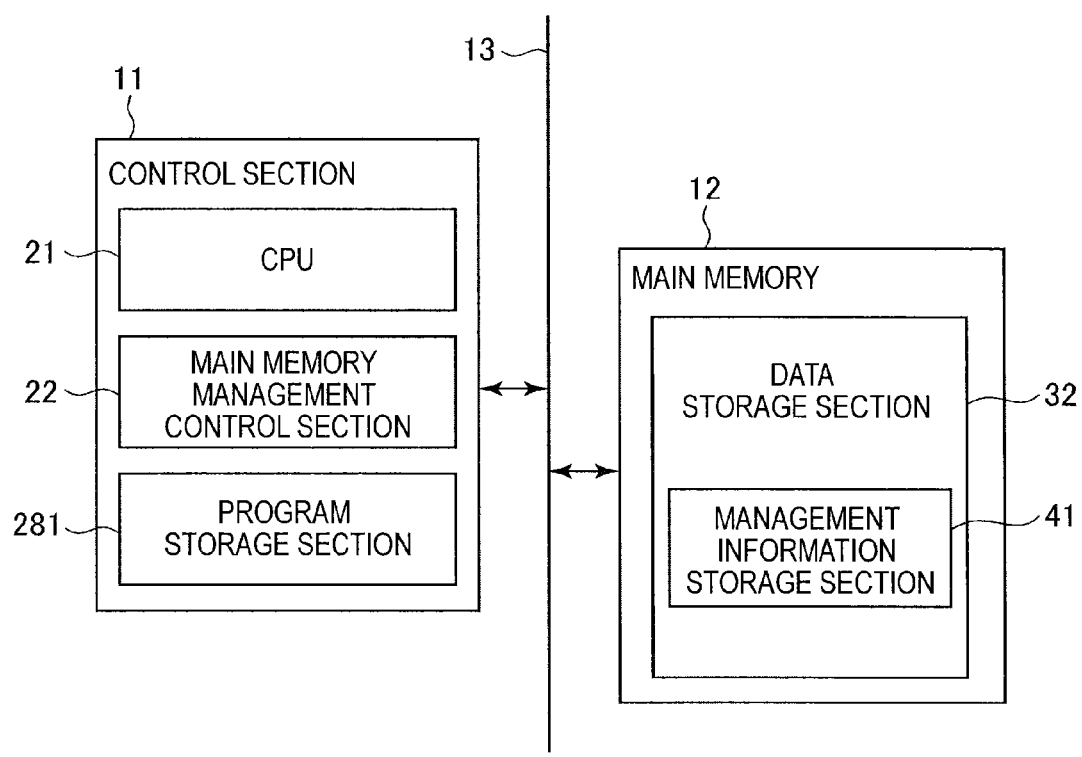
FIG. 23 is a diagram illustrating another configuration example of the information processing system.

Further, in the information processing system, a program to be executed by a CPU 21 may be stored in a control section 11. In this case, the information processing system, for example, is configured as illustrated in FIG. 23. Also, parts of FIG. 23 corresponding to those of FIG. 1 are assigned the same reference signs, and description thereof is appropriately omitted.

In the information processing system of FIG. 23, a program storage section 281 storing the program to be executed by the CPU 21 is provided within the control section 11. Therefore, the CPU 21 directly executes the program by accessing the program storage section 281.

In addition, in a main memory 12, no area for storing the program is provided, and only a data storage section 32 is provided. Therefore, a management information storage section 41 in which management information is stored is provided in a data storage section 32.

Second Embodiment

Configuration of Main Memory

Further, although the information processing system in which a main memory 12 and a control section 11, which perform management and the like of the main memory 12, are provided has been described above, a configuration for managing the main memory or a configuration for performing data access or the like may be provided.

Figure 24:
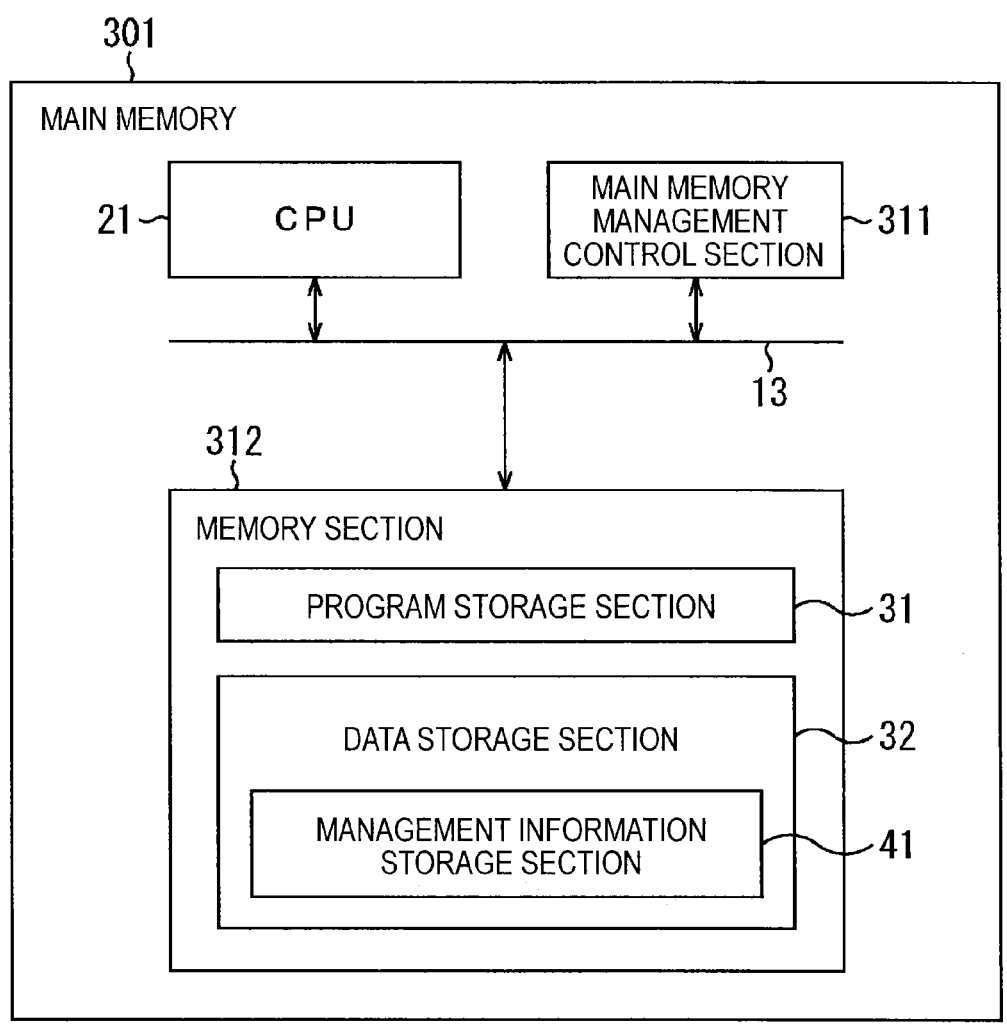
FIG. 24 is a diagram illustrating a configuration example of a main memory.

In this case, the main memory, for example, is configured as illustrated in FIG. 24. Also, parts of FIG. 24 corresponding to those of FIG. 1 are assigned the same reference signs, and description thereof is appropriately omitted.

A main memory 301 of FIG. 24 includes a CPU 21, a memory management control section 311, a bus 13, and a memory section 312. The CPU 21, the memory management control section 311, and the memory section 312 are mutually connected by the bus 13.

The memory section 312 is a nonvolatile memory having the upper limit in the rewrite frequency, and a program storage section 31 and a data storage section 32 are provided in the memory section 312. In addition, a management information storage section 41 is also provided in the data storage section 32.

The memory management control section 311 corresponds to the main memory management control section 22 of FIG. 1, accesses the program storage section 31 or the data storage section 32 of the memory section 312 via the bus 13, and supplies the CPU 21 with data or the like read from the memory section 312 if necessary. That is, the same configurations as the data processing section 101 to the rewrite frequency management section 105 of FIG. 5 are provided in the memory management control section 311.

The CPU 21 receives the supply of data or a program from the memory management control section 311 via the bus 13, and instructs the memory management control section 311 to write to or read from the memory section 312 if necessary.

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 25:
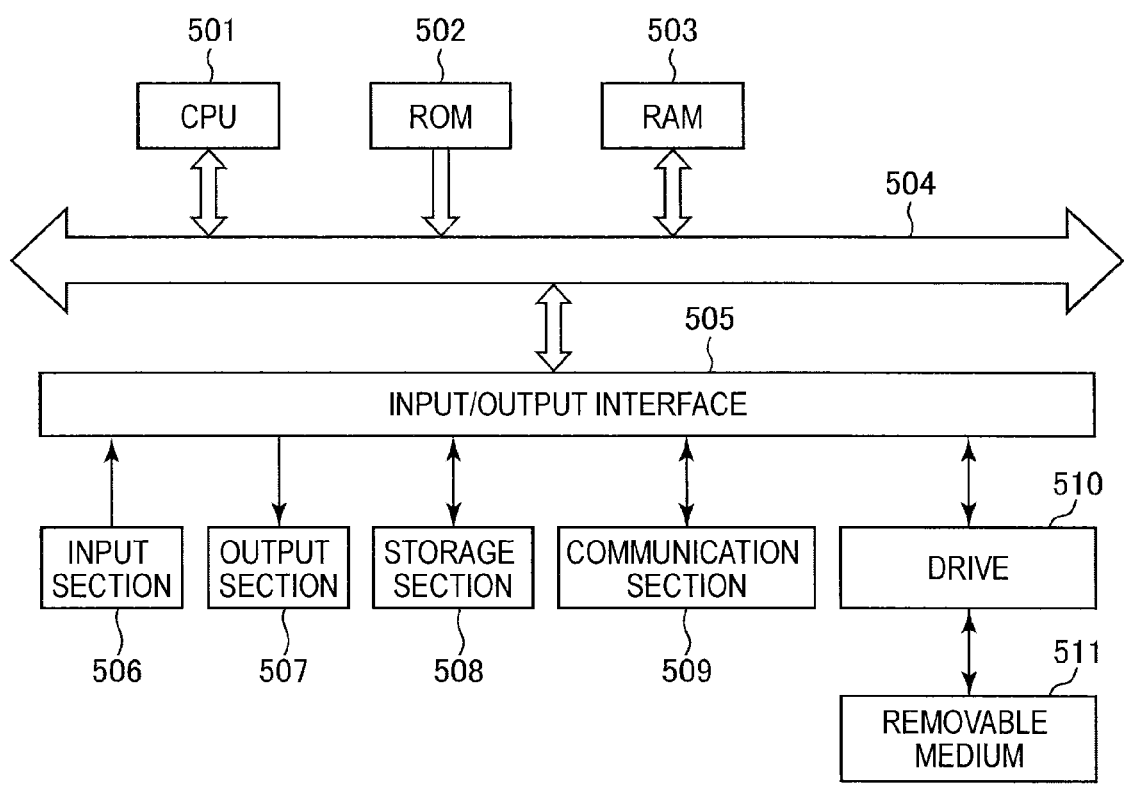
FIG. 25 is a diagram illustrating a configuration example of a computer.

FIG. 25 is a block diagram showing a hardware configuration example of a computer that performs the above-described series of processing using a program.

In the computer, a CPU 501, a read only memory (ROM) 502 and a random access memory (RAM) 503 are mutually connected by a bus 504.

An input/output interface 505 is also connected to the bus 504. An input section 506, an output section 507, a storage section 508, a communication section 509, and a drive 510 are connected to the input/output interface 505.

The input section 506 is configured from a keyboard, a mouse, a microphone or the like. The output section 507 configured from a display, a speaker or the like. The storage section 508 is configured from a hard disk, a non-volatile memory or the like. The communication section 509 is configured from a network interface or the like. The drive 510 drives a removable media 511 such as a magnetic disk, an optical disk, a magneto-optical disk, a semiconductor memory or the like.

In the computer configured as described above, as one example the CPU 501 loads a program stored in the storage section 508 via the input/output interface 505 and the bus 504 into the RAM 503 so as to realize the main memory management control section 22 in FIG. 1, or the like, for example, and executes the program to carry out the series of processes described earlier.

Programs to be executed by the computer (the CPU 501) are provided being stored in the removable media 511 which is a packaged media or the like. Also, programs may be provided via a wired or wireless transmission medium, such as a local area network, the Internet or digital satellite broadcasting.

In the computer, by loading the removable medium 511 into the drive 510, the program can be installed into the storage section 508 via the input/output interface 505. It is also possible to receive the program from a wired or wireless transfer medium using the communication section 509 and install the program into the storage section 508. As another alternative, the program can be installed in advance into the ROM 502 or the storage section 508.

It should be noted that the program executed by a computer may be a program that is processed in time series according to the sequence described in this specification or a program that is processed in parallel or at necessary timing such as upon calling.

The embodiment of the present technology is not limited to the above-described embodiment. It should be understood by those skilled in the art that various modifications, combinations, sub-combinations and alterations may occur depending on design requirements and other factors insofar as they are within the scope of the appended claims or the equivalents thereof.

For example, the present disclosure can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1) An information processing apparatus including:

a rewrite frequency management section configured to manage a rewrite frequency of a page included in a nonvolatile primary storage apparatus having an upper limit in the rewrite frequency; and a data processing section configured, when an instruction for writing write data to a predetermined page is issued and a rewrite frequency of the predetermined page reaches a threshold value that is less than the upper limit of the rewrite frequency of the primary storage apparatus, to write the write data to another page different from the predetermined page, the other page storing no effective data and having a rewrite frequency that does not reach the threshold value.

(2) The information processing apparatus according to (1), further including:

a threshold value update section configured, when all the rewrite frequencies of the pages are greater than or equal to the threshold value, to calculate a new threshold value that is greater than the threshold value and less than or equal to the upper limit, and to update the threshold value.

(3) The information processing apparatus according to (2), wherein the threshold value update section calculates a new threshold value by adding a fixed value specified for the upper limit to the threshold value.

(4) The information processing apparatus according to any one of (1) to (3), wherein, when the instruction for writing the write data to the predetermined page is issued and the rewrite frequency of the predetermined page and the rewrite frequency of the page storing no effective data is stored reach the threshold value, the data processing section searches for the page having the rewrite frequency that does not reach the threshold value from among the pages storing effective data, and moves data stored in the searched page to the page storing no effective data.

(5) The information processing apparatus according to (4), wherein the data processing section writes the write data to the searched page after moving the data of the searched page.

(6) The information processing apparatus according to any one of (1) to (5), wherein the rewrite frequency of the page is stored in the primary storage apparatus.

(7) The information processing apparatus according to (6), wherein the rewrite frequency of the page is stored in a position uniquely specified for the page or a position obtained in a calculation operation from the page position.

(8) The information processing apparatus according to any one of (1) to (7), further including:

a conversion information management section configured to allocate a virtual page number to the page and manage logical-physical conversion information indicating correspondence between the virtual page number of the page and a physical page number.

(9) The information processing apparatus according to (8), wherein, when a predetermined virtual page number is allocated to the predetermined page and the write data to which the predetermined virtual page number has been designated as a write destination has been written to the other page, the conversion information management section changes allocation of the predetermined virtual page number from the predetermined page to the other page.

(10) The information processing apparatus according to (8) or (9), wherein the rewrite frequency of the page is stored in an area different from that of the logical-physical conversion information.

(11) The information processing apparatus according to (10), wherein at least one of the logical-physical conversion information and the threshold value is stored in the page.

The present disclosure contains subject matter related to that disclosed in Japanese Priority Patent Application JP 2012-129671 filed in the Japan Patent Office on Jun. 7, 2012, the entire content of which is hereby incorporated by reference.

What is claimed is:

1. An information processing apparatus comprising:
a central processing unit configured to:
manage a rewrite frequency of a page included in a nonvolatile primary storage apparatus having an upper limit in the rewrite frequency;
write, when an instruction for writing write data to a predetermined page is issued and a rewrite frequency of the predetermined page reaches a threshold value that is less than the upper limit of the rewrite frequency of the nonvolatile primary storage apparatus, the write data to another page different from the predetermined page, the other page storing no effective data and having a rewrite frequency that does not reach the threshold value; and
calculate, when the rewrite frequencies of the pages are greater than or equal to the threshold value, a new threshold value that is greater than the threshold value and less than or equal to the upper limit, and update the threshold value.

2. The information processing apparatus according to claim 1, wherein the central processing unit is configured to calculate a new threshold value by adding a fixed value specified for the upper limit to the threshold value.

3. The information processing apparatus according to claim 1, wherein, when the instruction for writing the write data to the predetermined page is issued and the rewrite frequency of the predetermined page and the rewrite frequency of the other page storing no effective data reach the threshold value, the central processing unit is configured to search for a page whose rewrite frequency does not reach the threshold value among the pages storing effective data, and move data stored in the searched page to the other page storing no effective data.

4. The information processing apparatus according to claim 3, wherein the central processing unit is configured to write the write data to the searched page after moving the data of the searched page.

5. The information processing apparatus according to claim 4, wherein the rewrite frequency of the page is stored in the nonvolatile primary storage apparatus.

6. The information processing apparatus according to claim 5, wherein the rewrite frequency of the page is stored in a position uniquely specified for the page or a position obtained in a calculation operation from the page position.

7. The information processing apparatus according to claim 1, wherein the central processing unit is configured to:
allocate a virtual page number to the page and manage logical-physical conversion information indicating correspondence between the virtual page number of the page and a physical page number.

8. The information processing apparatus according to claim 7, wherein, when a predetermined virtual page number is allocated to the predetermined page and the write data to which the predetermined virtual page number has been designated as a write destination has been written to the other page, the central processing unit is configured to change allocation of the predetermined virtual page number from the predetermined page to the other page.

9. The information processing apparatus according to claim 8, wherein the rewrite frequency of the page is stored in an area different from that of the logical-physical conversion information.

10. The information processing apparatus according to claim 9, wherein at least one of the logical-physical conversion information or the threshold value is stored in the page.

11. An information processing method comprising:
managing a rewrite frequency of a page included in a nonvolatile primary storage apparatus having an upper limit in the rewrite frequency;
writing, when an instruction for writing write data to a predetermined page is issued and a rewrite frequency of the predetermined page reaches a threshold value that is less than the upper limit of the rewrite frequency of the primary storage apparatus, the write data to another page different from the predetermined page, the other page storing no effective data and having a rewrite frequency that does not reach the threshold value; and calculating, when the rewrite frequencies of the pages are greater than or equal to the threshold value, a new threshold value that is greater than the threshold value and less than or equal to the upper limit, and updating the threshold value.

12. A non-transitory computer readable medium having stored thereon a set of computer-executable instructions which when executed causes a computer to perform steps comprising:

managing a rewrite frequency of a page included in a nonvolatile primary storage apparatus having an upper limit in the rewrite frequency;

writing, when an instruction for writing write data to a predetermined page is issued and a rewrite frequency of the predetermined page reaches a threshold value that is less than the upper limit of the rewrite frequency of the primary storage apparatus, the write data to another page different from the predetermined page, the other page storing no effective data and having a rewrite frequency that does not reach the threshold value; and calculating, when the rewrite frequencies of the pages are greater than or equal to the threshold value, a new threshold value that is greater than the threshold value and less than or equal to the upper limit, and updating the threshold value.

* * * * *